(12) United States Patent  (10) Patent No.: US 8,107,194 B2
Jubert  (45) Date of Patent: Jan. 31, 2012

(54) WRITING AND READING MULTI-LAYER CONTINUOUS MAGNETIC RECORDING MEDIA

(75) Inventor: Pierre-Olivier Jubert, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 122 days.

(21) Appl. No.: 12/236,589

(22) Filed: Sep. 24, 2008

(65) Prior Publication Data
US 2010/0073814 A1  Mar. 25, 2010

(51) Int. Cl.
G11B 5/66 (2006.01)
(52) U.S. Cl. .......................... 360/135; 428/827; 428/828
(58) Field of Classification Search .................. 360/55, 360/131, 134, 135; 428/826, 827, 828, 828.1; 427/127
See application file for complete search history.

(56) References Cited

U.S. PATENT DOCUMENTS

| | | | |
|---|---|---|---|
| 4,151,602 A | | 4/1979 | Haisma et al. |
| 4,157,576 A | | 6/1979 | Hack et al. |
| 4,520,076 A | * | 5/1985 | Saito et al. ............. 428/611 |
| 5,319,481 A | | 6/1994 | Fergason |
| 5,319,501 A | | 6/1994 | Mitsuhashi |
| 5,331,728 A | | 7/1994 | Argyle et al. |
| 5,347,408 A | * | 9/1994 | Gohda et al. .............. 360/65 |
| 5,388,019 A | | 2/1995 | Argyle et al. |
| 5,453,886 A | * | 9/1995 | Kobayashi et al. ......... 360/46 |
| 5,635,835 A | | 6/1997 | Mouchot et al. |
| 5,851,643 A | | 12/1998 | Honda et al. |
| 5,869,963 A | | 2/1999 | Saito et al. |
| 5,912,783 A | * | 6/1999 | Ishida et al. .............. 360/88 |
| 5,958,541 A | | 9/1999 | Miller et al. |
| 6,153,062 A | | 11/2000 | Saito et al. |
| 6,322,933 B1 | | 11/2001 | Daiber et al. |
| 6,352,621 B1 | | 3/2002 | Saito et al. |
| 6,391,430 B1 | | 5/2002 | Fullerton et al. |
| 6,594,120 B2 | | 7/2003 | Odagawa et al. |

(Continued)

FOREIGN PATENT DOCUMENTS

JP  03272453 A * 12/1991

(Continued)

OTHER PUBLICATIONS

U.S. Appl. No. 12/237,431, filed Sep. 25, 2008; First Named Inventor Pierre-Olivier Jubert.

(Continued)

*Primary Examiner* — Will J Klimowicz
(74) *Attorney, Agent, or Firm* — Schmeiser, Olsen & Watts

(57) ABSTRACT

A method and apparatus for writing magnetization states in a pair of magnetic layers of a multi-layer continuous magnetic recording medium and a method and apparatus for reading readback pulse shapes representing a magnetization state transition between such written magnetization states of a two-layer continuous magnetic recording medium. Writing each magnetization state includes selecting the magnetization state, determining a write current sufficient to write the magnetization state, and applying the write current to a magnetic write head to write the magnetization state by simultaneously writing associated magnetic states in each magnetic layer of the pair of magnetic layers. A readback pulse shape representing a written magnetization state transition is read. The written magnetization state transition is uniquely identified from the readback pulse shape of the transition or from both the readback pulse shape of the transition and the readback pulse shape of one or more next magnetization state transitions.

18 Claims, 31 Drawing Sheets

U.S. PATENT DOCUMENTS

| | | |
|---|---|---|
| 6,610,602 B2 | 8/2003 | Gambino et al. |
| 6,620,532 B2 | 9/2003 | Aoyama |
| 6,865,044 B1 | 3/2005 | Albrecht et al. |
| 6,882,488 B1 | 4/2005 | Albrecht et al. |
| 6,906,879 B1 | 6/2005 | Albrecht et al. |
| 6,947,235 B2 | 9/2005 | Albrecht et al. |
| 7,060,393 B2 | 6/2006 | Tsukamoto et al. |
| 7,171,080 B2 | 1/2007 | Rausch |
| 7,271,984 B2* | 9/2007 | Umeda et al. ............... 360/131 |
| 7,282,278 B1* | 10/2007 | Nolan ...................... 428/831.2 |
| 7,355,884 B2 | 4/2008 | Nakayama et al. |
| 7,477,490 B2 | 1/2009 | Gao et al. |
| 7,518,907 B2 | 4/2009 | Nakayama et al. |
| 7,911,739 B2 | 3/2011 | Jubert |
| 2005/0053803 A1* | 3/2005 | Umeda et al. ............. 428/694 T |
| 2005/0084715 A1 | 4/2005 | Hee et al. |
| 2005/0122609 A1 | 6/2005 | Albrecht et al. |
| 2006/0177702 A1 | 8/2006 | Ajan |
| 2006/0222896 A1* | 10/2006 | Inomata et al. ............... 428/826 |
| 2006/0249391 A1 | 11/2006 | Jin |
| 2007/0218317 A1* | 9/2007 | Kurita et al. ............... 428/828.1 |
| 2008/0002296 A1* | 1/2008 | Umeda et al. ............... 360/131 |
| 2008/0063901 A1* | 3/2008 | Nakayama et al. .......... 428/827 |
| 2008/0085424 A1 | 4/2008 | Dobin et al. |
| 2008/0226817 A1* | 9/2008 | Lee .............................. 427/130 |
| 2009/0080109 A1* | 3/2009 | Fukuzawa et al. ............ 360/122 |
| 2009/0140358 A1 | 6/2009 | Nakayama et al. |
| 2009/0154219 A1 | 6/2009 | Hellwig et al. |
| 2010/0020437 A1 | 1/2010 | Dobin et al. |
| 2010/0053811 A1 | 3/2010 | Takeshita |
| 2010/0075178 A1 | 3/2010 | Jubert |
| 2011/0109984 A1 | 5/2011 | Jubert |

FOREIGN PATENT DOCUMENTS

| | | | |
|---|---|---|---|
| JP | 11328645 A | * | 11/1999 |

OTHER PUBLICATIONS

U.S. Appl. No. 12/615,375, filed Nov. 10, 2009; First Named Inventor Pierre-Olivier Jubert.

U.S. Appl. No. 12/615,290, filed Nov. 10, 2009; First Named Inventor Pierre-Olivier Jubert.

Office Action (Mail Date Jun. 25, 2010) for U.S. Appl. No. 12/237,431, filed Sep. 25, 2008; First Named Inventor: Pierre-Olivier Jubert.

Notice of Allowance (Mail Date Nov. 15, 2010) for U.S. Appl. No. 12/237,431, filed Sep. 25, 2008.

U.S. Appl. No. 13/028,582, filed Feb. 16, 2011.

USPTO Office Action (Mail Date Feb. 24, 2011) for U.S. Appl. No. 12/615,375, filed Nov. 10, 2009.

USPTO Office Action (Mail Date Feb. 24, 2011) for U.S. Appl. No. 12/615,290, filed Nov. 10, 2009.

Notice of Allowance (Mail Date May 31, 2011) for U.S. Appl. No. 12/615,375, filed Nov. 10, 2009.

Notice of Allowance (Mail Date May 25, 2011) for U.S. Appl. No. 13/028,582, filed Nov. 10, 2009.

* cited by examiner

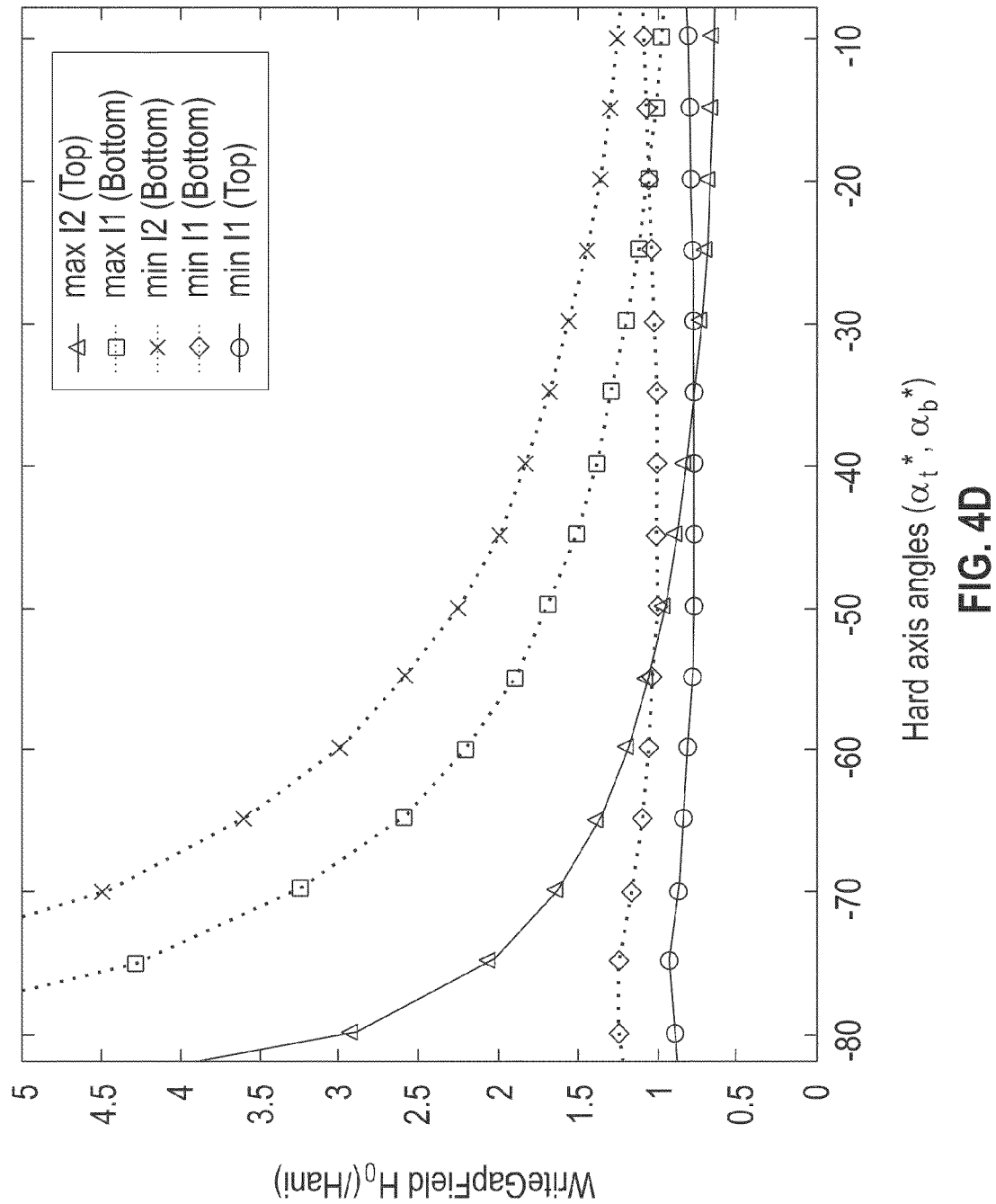

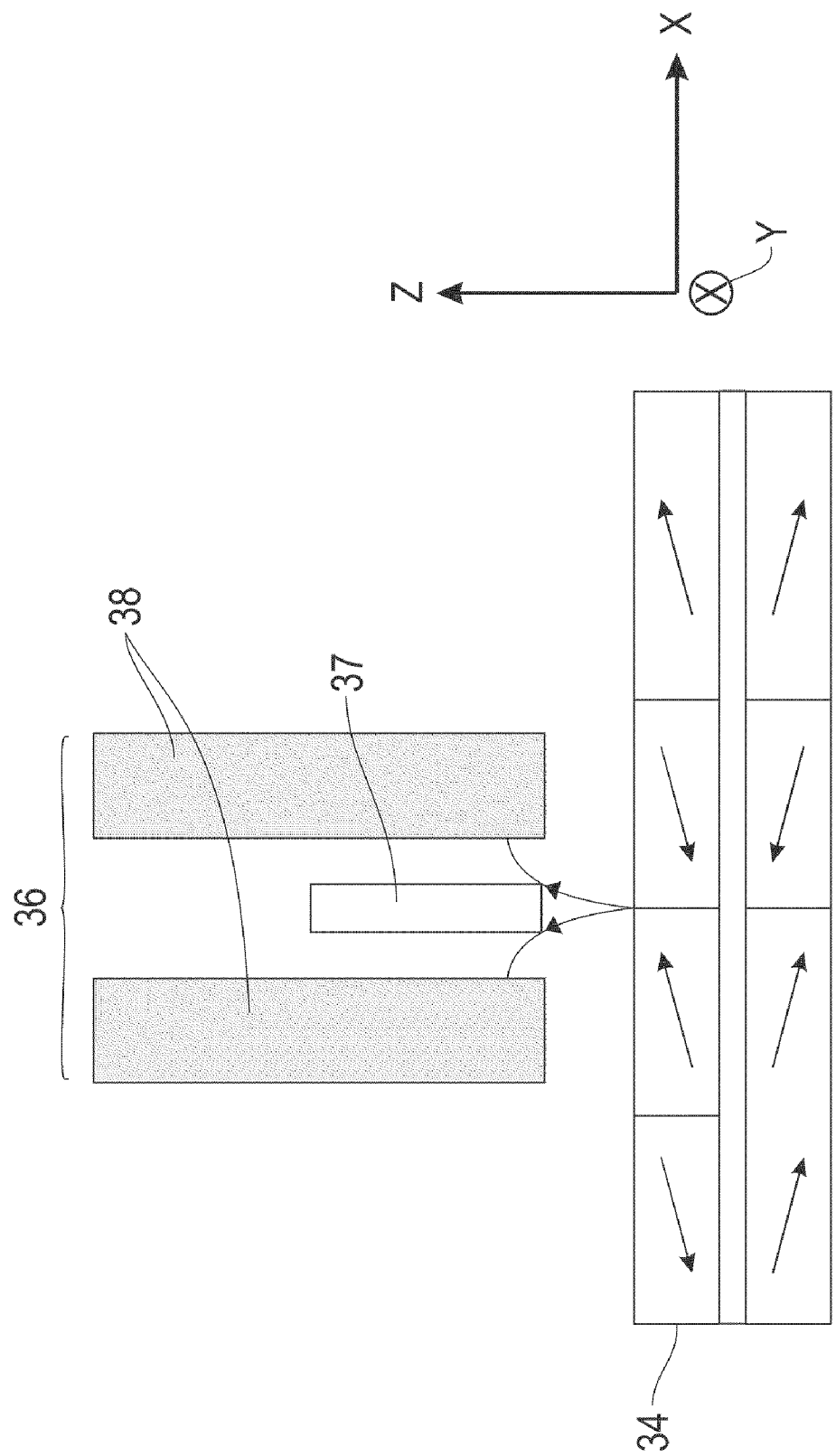

WRITING AND READING MULTI-LAYER CONTINUOUS MAGNETIC RECORDING MEDIA

FIELD OF THE INVENTION

The present invention relates to writing and reading multi-layer continuous magnetic recording media.

BACKGROUND OF THE INVENTION

Continuous magnetic recording media are currently used for recording bits of data thereon. With conventional continuous magnetic recording, however, there are limitations on the achievable recording density and on the efficiency of writing bits of data on the continuous magnetic recording media.

SUMMARY OF THE INVENTION

The present invention provides a method for writing magnetization states in a multi-layer continuous magnetic medium comprising a plurality of magnetic layers, each magnetic layer comprising magnetic material continuously distributed in an X-Y plane defined by an X direction and a Y direction orthogonal to each other, consecutive magnetic layers separated by non-magnetic spacer material and distributed along a Z direction orthogonal to the X-Y plane, said method comprising:

selecting a magnetization state [S1; S2] comprising a magnetic state (S1) and a magnetic state (S2) in a first magnetic layer and in a second magnetic layer, respectively, of the plurality of magnetic layers, wherein $\alpha_1^*$ and $\alpha_2^*$ are a first tilt angle and a second tilt angle at which a hard axis of the first magnetic layer and the second magnetic layer are respectively oriented with respect to the X direction, and wherein either or both of $\alpha_1^*$ and $\alpha_2^*$ are in a range of 0 to −90 degrees;

determining a write current (I) sufficient to write the magnetization state [S1; S2];

applying the write current I to a magnetic write head moving in the X direction to generate in the first magnetic layer and the magnetic second layer a magnetic field that exceeds a switching field of the first magnetic layer and a switching field of the second magnetic layer;

responsive to said applying, said magnetic write head writing the magnetization state [S1; S2] by simultaneously writing the magnetic state S1 in the first magnetic layer and the magnetic state S2 in the second magnetic layer.

The present invention provides a method for reading magnetic state transitions in a two-layer continuous magnetic medium comprising two magnetic layers, each magnetic layer comprising magnetic material continuously distributed in an X-Y plane defined by an X direction and a Y direction orthogonal to each other, said two magnetic layers separated by non-magnetic spacer material and distributed along a Z direction orthogonal to the X-Y plane, said method comprising:

reading at a specific location (x) of the medium along the X direction, by a magnetic read head moving in the X direction, a readback pulse shape W(x) associated with a magnetization state transition $T_{ij}(x)$ from a magnetization state $[S1; S2]_i$ to a magnetization state $[S1; S2]_j$, wherein i and j are each 1, 2, 3, or 4 subject to i≠j, wherein S1 and S2 is a magnetic state in a first magnetic layer and in a second magnetic layer, respectively, of the two magnetic layers, wherein the first magnetic layer and the second magnetic layer have a magnetic easy axis respectively oriented at a first tilt angle ($\alpha_1$) and a second tilt angle ($\alpha_2$) with respect to the X direction, wherein the magnetization state $[S1; S2]_1$, $[S1; S2]_2$, $[S1; S2]_3$, and $[S1; S2]_4$ respectively corresponds to a state A=[+1,+1], a state B=[−1,−1], a state C=[+1,−1], and a state D=[−1,+1], wherein the magnetic state S1 is respectively +1 or −1 if a magnetization of the first layer is oriented at or opposite the angle $\alpha_1$, wherein the magnetic state S2 is respectively +1 or −1 if a magnetization of the second layer is oriented at or opposite the angle $\alpha_2$, and wherein the first magnetic layer and the second magnetic layer have a magnetic hard axis respectively oriented at a first tilt angle ($\alpha_1^*$) and a second tilt angle ($\alpha_2^*$) with respect to the X direction;

after said reading W(x), identifying from W(x), a set (T) of magnetization state transitions, wherein either 1) the set (T) consists of $T_{ij}(x)$ if W(x) has a pulse shape that is distinctive and distinguishable from the readback pulse shape of each other magnetization state transition of all possible magnetization state transitions so as to uniquely identify $T_{ij}(x)$ or 2) the set (T) comprises $T_{ij}(x)$ and at least one other magnetization state transition of the all possible magnetization state transitions whose associated readback pulse shape is not distinctive and distinguishable from the readback pulse shape of W(x);

if the set T comprises $T_{ij}(x)$ and the at least one other magnetization state transition, then reading, by the magnetic read head moving in the X direction, a next M readback pulse shapes denoted as $W(x_1), W(x_2), \ldots, W(x_M)$ corresponding to the next M magnetization state transitions read by the magnetic read head at positions $x_1, x_2, \ldots, x_M$ ($x<x_1<x_2<\ldots<x_M$) in the magnetic medium along the X direction, wherein M is at least 1, wherein $W(x_M)$ has a shape that is distinctive and distinguishable from the readback pulse shape of all other magnetization state transitions of the all possible magnetization state transitions, and wherein W(x) together with the next M readback pulse shapes uniquely identify $T_{ij}(x)$;

identifying the magnetization state transition $T_{ij}(x)$ from W(x) if the set (T) consists of $T_{ij}(x)$ or from W(x) together with the next M readback pulse shapes if the set (T) comprises $T_{ij}(x)$ and the at least one other magnetization state transition;

displaying and/or recording the identified magnetization state transition $T_{ij}(x)$.

The present invention provides a structure comprising a multi-layer continuous magnetic medium comprising a plurality of magnetic layers, each magnetic layer comprising magnetic material continuously distributed in an X-Y plane defined by an X direction and a Y direction orthogonal to each other, consecutive magnetic layers separated by non-magnetic spacer material and distributed along a Z direction orthogonal to the X-Y plane, wherein the plurality of magnetic layers comprise a first magnetic layer and a second magnetic layer, wherein the first magnetic layer and the second magnetic layer have a magnetic easy axis respectively oriented at a first tilt angle ($\alpha_1^*$) and a second tilt angle ($\alpha_2^*$) with respect to the X direction, wherein the first magnetic layer and the second magnetic layer have a magnetic hard axis respectively oriented at a first tilt angle ($\alpha_1^*$) and a second tilt angle ($\alpha_2^*$) with respect to the X direction, wherein ($-80 \leq \alpha_1^* \leq -10$ and $-180<\alpha_2^*<-90$) or ($-180<\alpha_1^*<-90$ and $-80 \leq \alpha_2^* \leq -10$) or ($-80 \leq \alpha_1^* \leq -10$ and $-90<\alpha_2^*<0$) or ($-90<\alpha_1^*<0$ and $-80 \leq \alpha_2^* \leq -10$).

The present invention provides an apparatus comprising a computer program product, said computer program product comprising a computer readable storage medium having a computer readable program code embodied therein, said computer readable program code containing instructions that when executed by a processor of a computer system implement a method for writing magnetization states in a multilayer continuous magnetic medium comprising a plurality of magnetic layers, each magnetic layer comprising magnetic material continuously distributed in an X-Y plane defined by an X direction and a Y direction orthogonal to each other, consecutive magnetic layers separated by non-magnetic spacer material and distributed along a Z direction orthogonal to the X-Y plane, said method comprising:

selecting a magnetization state [S1; S2] comprising a magnetic state (S1) and a magnetic state (S2) in a first magnetic layer and in a second magnetic layer, respectively, of the plurality of magnetic layers, wherein $\alpha_1^*$ and $\alpha_2^*$ are a first tilt angle and a second tilt angle at which a hard axis of the first magnetic layer and the second magnetic layer are respectively oriented with respect to the X direction, and wherein either or both of $\alpha_1^*$ and $\alpha_2^*$ are in a range of 0 to −90 degrees;

determining a write current (I) sufficient to write the magnetization state [S1; S2];

issuing a command for applying the write current I to a magnetic write head moving in the X direction to generate in the first magnetic layer and the second magnetic layer a magnetic field that exceeds a switching field of the first magnetic layer and a switching field of the second magnetic layer, respectively, said command causing the magnetic write head to write the magnetization state [S1; S2] by simultaneously writing the magnetic state S1 in the first magnetic layer and the magnetic state S2 in the second magnetic layer.

The present invention provides an apparatus comprising a computer program product, said computer program product comprising a computer readable storage medium having a computer readable program code embodied therein, said computer readable program code containing instructions that when executed by a processor of a computer system implement a method for reading magnetic state transitions in a two-layer continuous magnetic medium comprising two magnetic layers, each magnetic layer comprising magnetic material continuously distributed in an X-Y plane defined by an X direction and a Y direction orthogonal to each other, consecutive magnetic layers separated by non-magnetic spacer material and distributed along a Z direction orthogonal to the X-Y plane, said method comprising:

issuing a first command for reading at a specific location (x) of the medium along the X direction, by a magnetic read head moving in the X direction, a readback pulse shape W(x) associated with a magnetization state transition $T_{ij}(x)$ from a magnetization state [S1; S2]$_i$ to a magnetization state [S1; S2]$_j$, wherein i and j are each 1, 2, 3, or 4 subject to i≠j, wherein S1 and S2 is a magnetic state in a first magnetic layer and in a second magnetic layer, respectively, of the two magnetic layers, wherein the first magnetic layer and the second magnetic layer have a magnetic easy axis respectively oriented at a first tilt angle ($\alpha_1$) and a second tilt angle ($\alpha_2$) with respect to the X direction, wherein the magnetization state [S1; S2]$_1$, [S1; S2]$_2$, [S1; S2]$_3$, and [S1; S2]$_4$ respectively corresponds to a state A=[+1,+1], a state B=[−1,−1], a state C=[+1,−1], and a state D=[−1,+1], wherein the magnetic state S1 is respectively +1 or −1 if a magnetization of the first layer is oriented at or opposite the angle $\alpha_1$, wherein the magnetic state S2 is respectively +1 or −1 if a magnetization of the second layer is oriented at or opposite the angle $\alpha_2$, and wherein the first magnetic layer and the second magnetic layer have a magnetic hard axis respectively oriented at a first tilt angle ($\alpha_1^*$) and a second tilt angle ($\alpha_2^*$) with respect to the X direction;

after said reading W(x) resulting from said first command, identifying from W(x), a set (T) of magnetization state transitions, wherein either 1) the set (T) consists of $T_{ij}(x)$ if W(x) has a readback pulse shape that is distinctive and distinguishable from the readback pulse shape of each other state transition of all possible state transitions so as to uniquely identify $T_i(x)_j$ or 2) the set (T) comprises $T_{ij}(x)$ and at least one other state transition of the all possible state transitions whose associated readback pulse shape is not distinctive and distinguishable from the readback pulse shape of W(x);

if the set T comprises $T_{ij}(x)$ and the at least one other state transition, then issuing a second command for reading, by the magnetic read head moving in the X direction, a next M readback pulse shapes denoted as $W(x_1), W(x_2), \ldots, W(x_M)$ corresponding to the next M magnetization state transitions read by the magnetic read head at positions $x_1, x_2, \ldots, x_M$ ($x < x_1 < x_2 < \ldots < x_M$) in the magnetic medium along the X direction, wherein M is at least 1, wherein $W(x_M)$ has a readback pulse shape that is distinctive and distinguishable from the readback pulse shape of all other magnetization state transitions of the all possible state transitions, and wherein W(x) together with the next M readback pulse shapes uniquely identify $T_{ij}(x)$;

identifying the magnetization state transition $T_{ij}(x)$ from W(x) if the set (T) consists of $T_{ij}(x)$ or from W(x) together with the next M readback pulse shapes if the set (T) comprises $T_{ij}(x)$ and the at least one other state transition;

displaying and/or recording the identified magnetization state transition $T_{ij}(x)$.

The present invention provides magnetic recording with a continuous recording medium that allows increased recording density and improves the efficiency of writing bits of data on the continuous multi-layer recording medium.

BRIEF DESCRIPTION OF THE DRAWINGS

FIGS. 4A, 4B, 4C, 4D, 4E, and 4F show calculations of the write current for multi-layered continuous magnetic media for various ranges of hard axis angle in the top and bottom layers, in accordance with embodiments of the present invention.

FIGS. 5a-5l depict readback pulse shapes of the 12 magnetization state transitions for a particular example, in accordance with embodiments of the present invention.

FIG. 6C depicts a magnetic read head above a magnetic medium, in accordance with embodiments of the present invention.

DETAILED DESCRIPTION OF THE INVENTION

The present invention provides multi-layer continuous magnetic recording medium comprising N layers (N≧2), a method for writing independent bits simultaneously at two layers of the medium thus reducing the writing steps for the two layers by a factor of 2. The present invention also provides a method for reading the information states stored in simultaneously written two layers of a two-layer continuous magnetic recording medium. The method and system of the present invention is with respect to a two-layer magnetic medium (i.e., N=2) or to a selected two layers of a magnetic medium comprising more than 2 layers (i.e., N>2).

Figure 1:
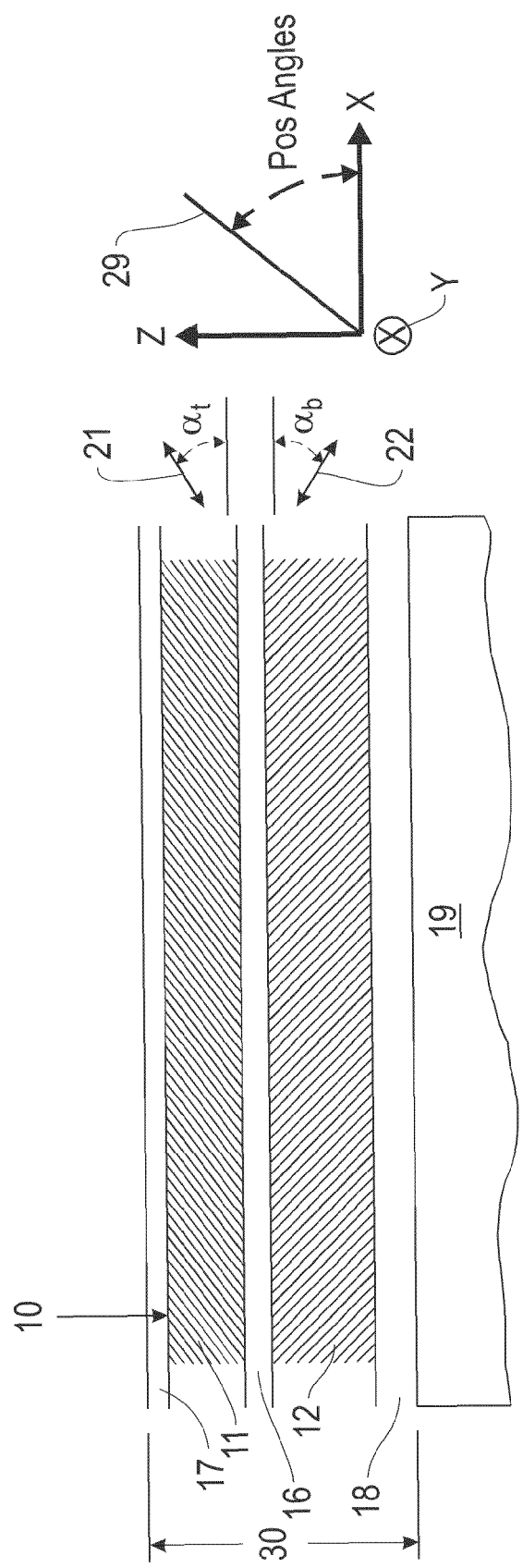
FIG. 1 is a schematic description of a multi-layer continuous magnetic medium with 2 layers, in accordance with embodiments of the present invention.

FIG. 1 is a schematic description of a multi-layer continuous magnetic medium 30 with 2 layers, in accordance with embodiments of the present invention. FIG. 1 depicts X, Y, and Z axes of a (X, Y, Z) right-handed rectangular coordinate system in which the X, Y, and Z directions are mutually orthogonal to one another. An X direction along the X axis and a Y direction along the Y axis define an X-Y plane. A Z direction along the Z axis is orthogonal to the X-Y plane. The magnetic medium 30 comprises a recording layer made of a top granular or particulate magnetic layer 11, a bottom granular or particulate magnetic layer 12, a spacer layer 16 between the top layer 11 and the bottom layer 12, and a substrate 19. The top layer 11 and the bottom layer 12 each comprise magnetic material continuously distributed in the X-Y plane. In one embodiment, the spacer layer 16 does not exist and consecutive magnetic layers stacked along the Z direction are not physically separated from each other but nonetheless behave independently. The magnetic medium 30 may include an overcoat 17 and an under-layer 18 between the recording layer and a substrate 19.

In one embodiment, the substrate 19 may comprise a material used in disk drives (e.g., conventional disk drives), including a material such as, inter alia, glass and AlMg. In one embodiment, the substrate 19 may comprise a semiconductor material such as, inter alia, silicon. In one embodiment, the substrate 19 may be a plastic substrate (e.g., PET, PEN, Aramid) used for tape media.

In one embodiment, the under-layer 18 may include one or more materials can be used as seeds and for promoting orientation of the magnetic layers and may include, inter alia, Ti, Cr, C, NiAl, CoCr, CoO, etc.

In one embodiment, the overcoat 17 may be, inter alia, a diamond-like carbon overcoat, a lubricant layer, etc.

The top layer 11 and the bottom layer 12 are parallel to the plane (XY) that includes the X and Y directions and are separated in the Z direction which is orthogonal to the X direction (see FIG. 1B) by the non-magnetic layer 16. In one embodiment, the spacer layer 16 comprises a non-magnetic spacer material such as, inter alia, Cu, Ag, Au, Ru, CoO, SiO, etc. In one embodiment, the spacer layer 16 comprises a ferromagnetic material that does not disturb the magnetic behavior of the top layer 11 and the bottom layer 12. In another embodiment, the top layer 11 and the bottom layer 12 are not physically separated from each other but nonetheless behave independently.

The magnetic material of each top layer 11 and bottom layer 12 may comprise, inter alia, thin film or particulate, made of Fe, Co, Ni, or made of an alloy containing at least one element among Fe, Co, Ni, Mn, Cr. Typical media materials are based on: Co alloys (e.g., CoPtCr, Co Co$_3$Pt); magnetic alloys with L10 phase (e.g., FePd, FePt, CoPt, MnAl), rare earth alloys (e.g., FeNdB, SmCo$_5$); oxides (e.g., CrO$_2$, Fe$_3$O$_4$, (CoFe)$_3$O$_4$, BaFeO).

FIG. 1 depicts an (X, Y, Z) rectangular coordinate system. In the forward direction, the magnetic head (see FIG. 6) is moving in the positive X direction. In the reverse direction, the magnetic head is moving in the negative X direction. Any line or vector, as represented by the line 29 in FIG. 1, makes a positive angle with the X axis as shown. Unless otherwise stated, all numerical values of angles appearing herein, including in the claims, are in units of degrees.

Figure 6A:
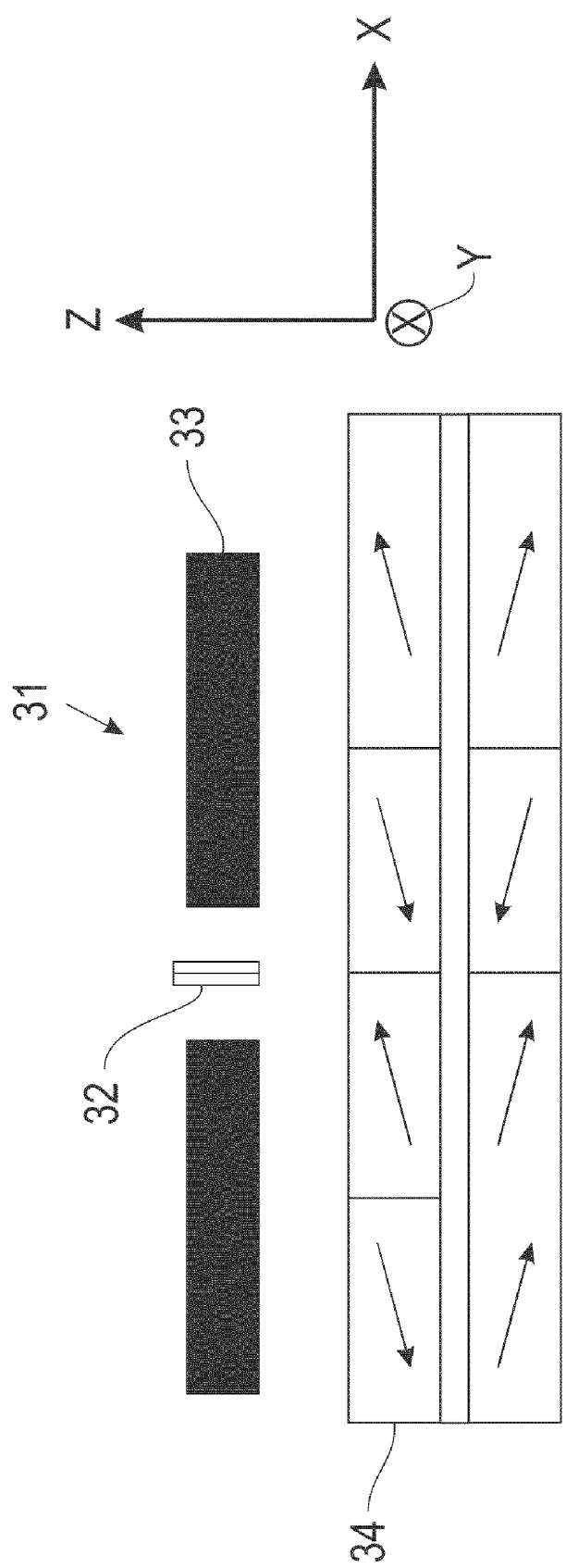
FIG. 6A depicts a magnetic read head above a magnetic medium, in accordance with embodiments of the present invention.

FIG. 6A depicts a magnetic read head 31 above the magnetic medium 34, which is analogous to the magnetic medium 30 of FIG. 1, such that the read head 31 is configured to move in the +X or −X direction, in accordance with embodiments of the present invention. The read head 31, which comprises a magnetoresistive read element 32 and a magnetic shield 33 surrounding the magnetoresistive read element 32, is configured to read data from the magnetic medium 34.

Figure 6B:
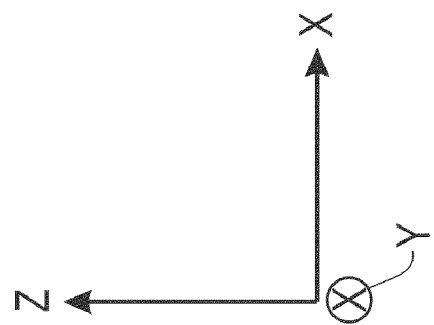
FIG. 6B depicts a magnetic write head above a magnetic medium, in accordance with embodiments of the present invention.
Figure 6B:
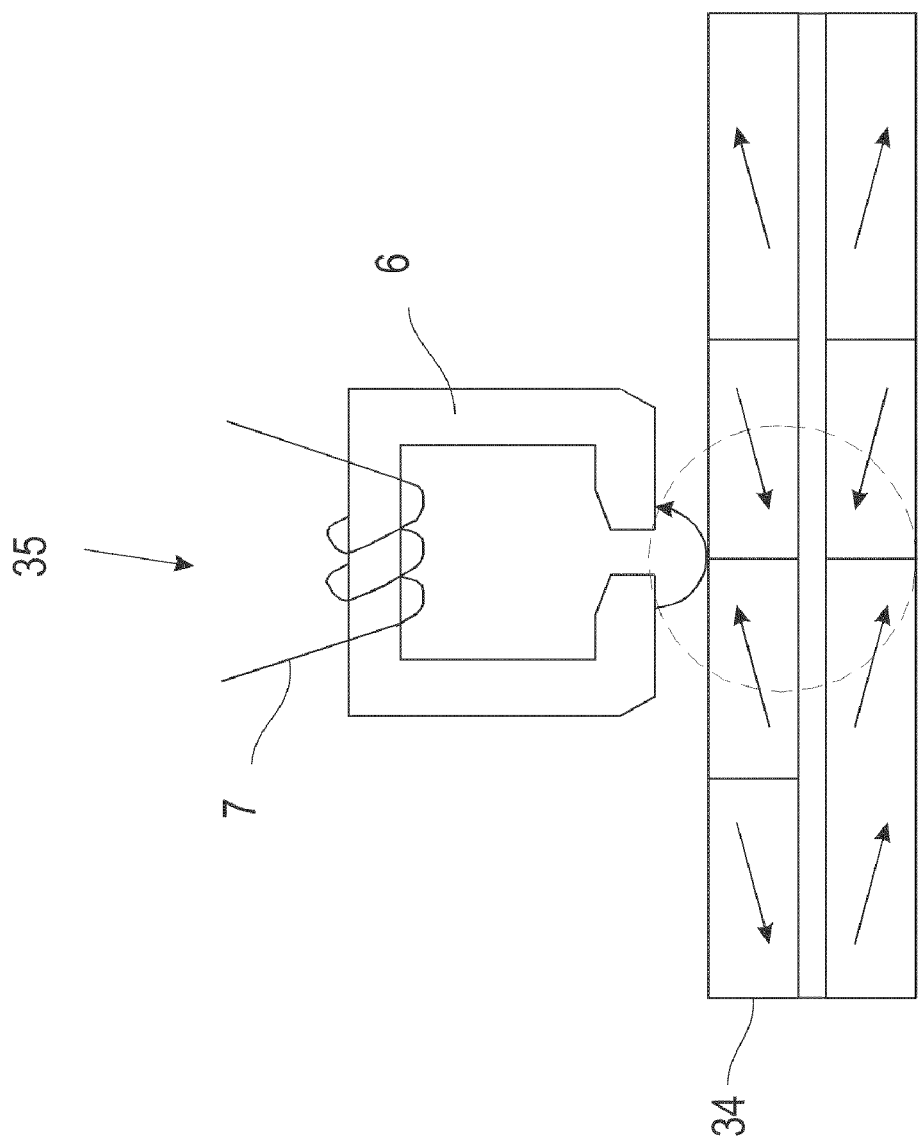

FIG. 6B depicts a magnetic write head 35 above a magnetic medium 34, in accordance with embodiments of the present invention. The write head 35 comprises a coil 7 wound around a soft core 6 and configured to carry an electric current in the coil wire 7 for generating a magnetic field that extends into the medium 34 and has a field strength exceeding the coercivity (i.e., switching field) of the medium 34 so as to write data to the magnetic medium 34.

FIG. 6C depicts a magnetic read head 36 above the magnetic medium 34, in accordance with embodiments of the present invention. The read head 36, which comprises a magnetoresistive read element 37 and a magnetic shield 38 surrounding the magnetoresistive read element 37, is configured to read data from the magnetic medium 34.

Figure 6D:
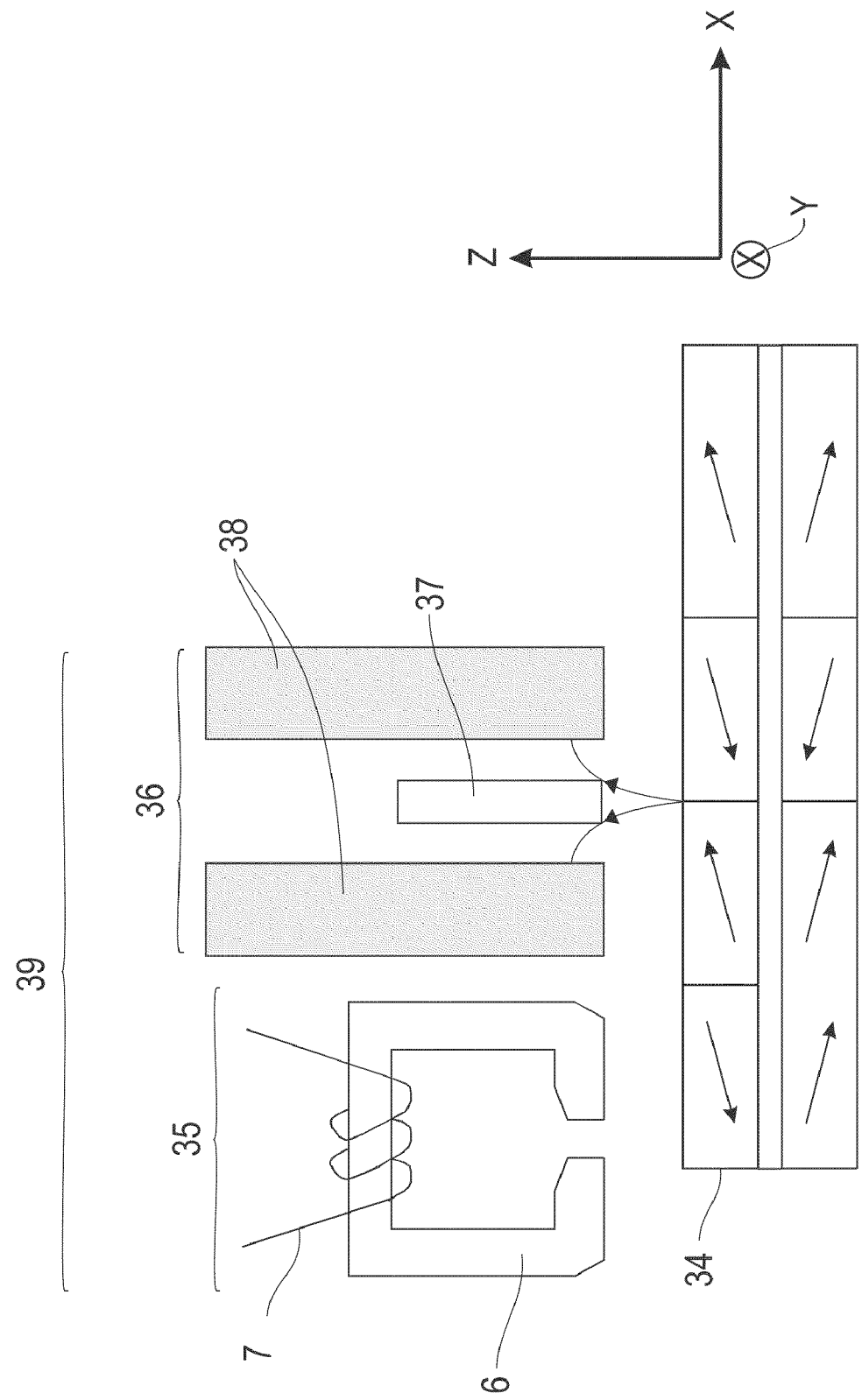
FIG. 6D depicts a magnetic read/write head above a magnetic medium, in accordance with embodiments of the present invention.

FIG. 6D depicts a magnetic read/write head 39 above a magnetic medium 34, in accordance with embodiments of the present invention. The magnetic read/write head 39, which comprises the write head 35 of FIG. 6B and the read head 36 of FIG. 6C, is configured to both write data to and read data from the magnetic medium 34.

In FIGS. 6A-6D, the read heads 31 and 36 and the write head 35 each extend along the Y direction.

For the description herein, a magnetic write head is a magnetic head that is configured to write to, but not to read from, a magnetic medium (e.g., the write head 35 of FIG. 6B or of FIG. 6D). Similarly, a magnetic read head is a magnetic head that is configured to read from, but not write to, a magnetic medium (e.g., the read head 31 of FIG. 6A or the read head 36 of FIG. 6C or FIG. 6D).

In FIG. 1, the top layer 11 comprises: magnetic material having a magnetic easy axis tilted at an angle $\alpha_t$ ($-90<\alpha_t<90$) with respect to the X axis, a magnetic hard axis tilted at an angle $\alpha_t^*$ ($-180<\alpha_t^*<0$) with respect to the X axis, a switching field $H_{sw,t}$, a remanent magnetization $M_{r,t}$, and a thickness $T_t$ in the Z direction. The magnetization 21 in the top layer 11 represents a magnetic state that is oriented along the easy axis, either at the angle at with respect to the X axis or at the angle $180+\alpha_t$ with respect to the X axis.

The bottom layer 12 comprises magnetic material having a magnetic easy axis that is tilted at an angle $\alpha_b$ ($-90<\alpha_b<90$) with respect to the X axis, a magnetic hard axis tilted at an angle $\alpha_b^*$ ($-180<\alpha_b^*<0$) with respect to the X axis, a switching field $H_{sw,b}$, a remanent magnetization $M_{r,b}$, and a thickness $T_b$ in the Z direction. The magnetization 22 in the bottom layer 12 represents a magnetic state in the bottom layer 12 that is oriented along the easy axis, either at the angle $\alpha_b$ with respect to the X axis or at the angle $180+\alpha_b$ with respect to the X axis.

The hard axis tilt angle $\alpha_t^*$ can be between $-80$ and $-10$ degrees. Then, if recording in both +X and -X directions is required, $\alpha_b^*$ should be between $-170$ and $-100$ degrees. Otherwise, $\alpha_b^*$ can be any angle given certain conditions that vary with $\alpha_t^*$, $H_{sw,b}/H_{sw,t}$ ratio, the medium thicknesses $T_b$ in the Z direction, the head-media spacing, and the write head characteristics.

The hard axis tilt angle $\alpha_b^*$ can be between $-80$ and $-10$ degrees. Then, if recording in both +X and -X directions is required $\alpha_t^*$ should be between $-170$ and $-100$ degrees. Otherwise, at can be any angle given certain conditions that vary with $\alpha_b^*$, $H_{sw,b}/H_{sw,t}$ ratio, the thicknesses $T_b$ in the Z direction, the head-media spacing, and the write head characteristics.

The angles $\alpha_t^*$, $\alpha_b^*$, $\alpha_t$, $\alpha_b$, of the top layer 11 and the bottom layer 12, the dimensions and thickness $T_t$ and $T_b$ of the top layer 11 and the bottom layer 12, the thickness of the spacer layer 16, the magnetic materials of the top layer 11 and the bottom layer 12 and the switching fields $H_{sw,t}$, $H_{sw,b}$ of the top layer 11 and the bottom layer 12, respectively, can be adjusted for optimum writing, optimum data retention, and such that all four possible magnetization states in the medium are differentiated in the readback signal.

Each layer of the magnetic medium 30 can be made of a large assembly of nanoparticles with a similar easy axis within each layer and an independent easy axis for each layer. When all nanoparticles are aligned in the same positive direction, and when there is no spacer layer, the depth of the transition between the top layer 11 and the bottom layer 12 can be defined by the write current applied to the magnetic head 35 of FIG. 6B or of FIG. 6D.

The present invention enables writing the two-layer multi-layer magnetic medium 30 at two depths simultaneously.

With two layers being written, there are $2^2=4$ possible magnetic states of the medium at a given X position. Each magnetization state is defined by the orientation of the magnetization $M_{r,t}$ and $M_{r,b}$ in the top and bottom layers, respectively. With +1 corresponding to the magnetization along $\alpha_t$ or $\alpha_b$, -1 corresponding to the magnetization along $180+\alpha_t$ or $180+\alpha_b$, the 4 magnetization states are A=[+1,+1], B=[-1;-1], C=[+1,-1], D=[-1,+1]. Thus, the magnetization state [S1; S2] represents A, B, C, or D with the first magnetic state S1=±1 and the second magnetic state S2=±1 defining the magnetic orientation of the top layer 11 and the bottom layer 12, respectively.

The magnetization of the top and bottom layers of the medium is set simultaneously by using an adequate write current applied to the magnetic write head 35 of FIG. 6B or FIG. 6D. For each of the 4 recording medium states (A, B, C, D), there is a different write current: I1, I2, -I1 and -I2. These write currents are defined by the write head characteristics, the head-media spacing, and the dimensions and magnetic parameters of the medium (hard axis angles, anisotropy field values, angular dependence of the switching fields). The writing process is described in detail infra.

Writing the two layers simultaneously uses any write head such as a conventional write head (e.g., a conventional ring head). Such a write head generates magnetic fields in the magnetic medium. The field amplitude increases with increasing write current. The field amplitude decreases with increasing distance from the write gap center to a position in the medium. The field angle $\phi$ (with respect to the X axis) also varies depending on the relative position of the head to the medium as illustrated in FIG. 2.

Figure 2:
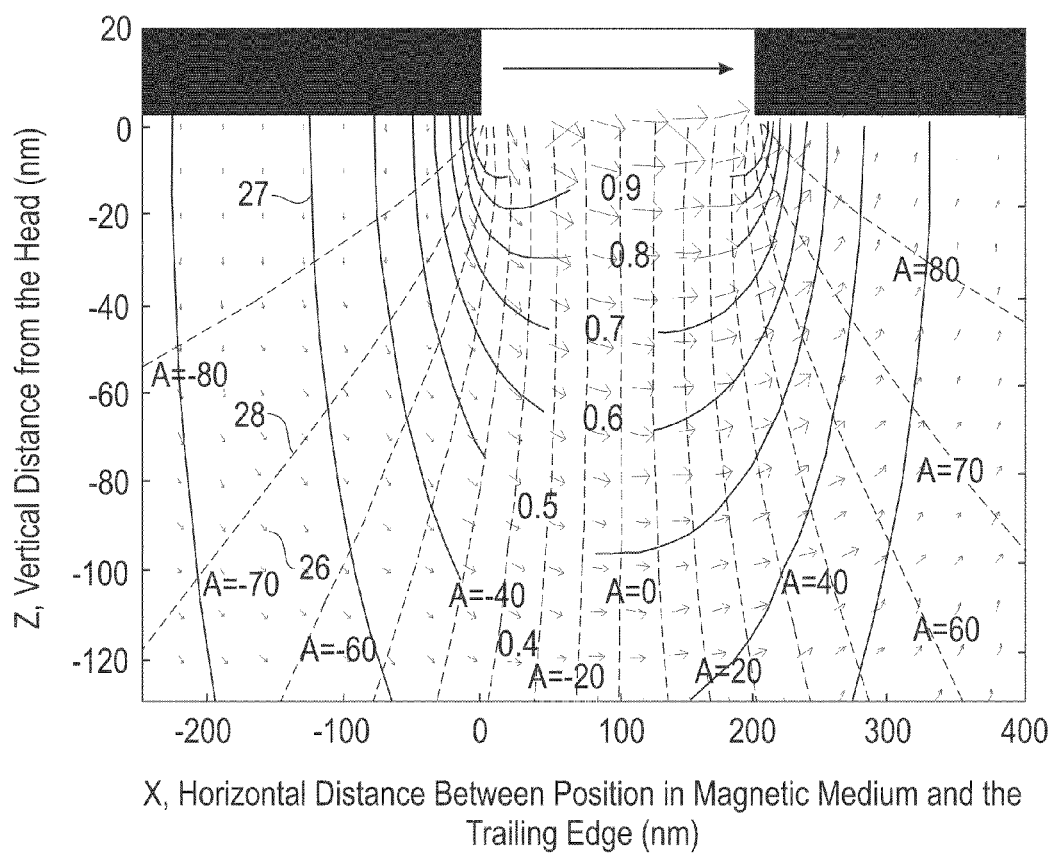
FIG. 2 is a representation of magnetic fields generated by a write head, in accordance with embodiments of the present invention.

FIG. 2 is a representation of magnetic fields generated by a write head, in accordance with embodiments of the present invention. Given a position (X, Z) in the magnetic medium, X denotes the distance (in the X-direction) between the position (X, Z) in the magnetic medium and a trailing edge of the write head, and Z denotes the distance (in the Z direction) between the position (X, Z) in the magnetic medium and the write head. Arrows 26 represents magnetic field direction and field amplitude at given points. Lines 27 are contour plots of the field normalized to the deep gap field Hg (levels going from 0.2 to 1). Lines 28 are contour plots of the field angle $\phi$ (levels of 0 degree to +/-80 degrees). Note that Hg is proportional to the write current I: $Hg \cdot g = N \cdot I \cdot \epsilon$, with g the write gap, N the number of turns, and $\epsilon$ the efficiency of the head. This is a calculation using Karlqvist approximation with a write gap g of 200 nm.

A magnetic layer of the medium switches its magnetization when the field to which it is submitted is larger than the switching field ($H_{sw}$) of that layer. The value of the switching field depends on the material properties of the magnetic layer and of the relative angle between the applied field and the magnetic layer easy or hard axis direction. The material properties of the magnetic layer is determined by the magnetic medium and defines the anisotropy field $H_a$.

Figure 3:
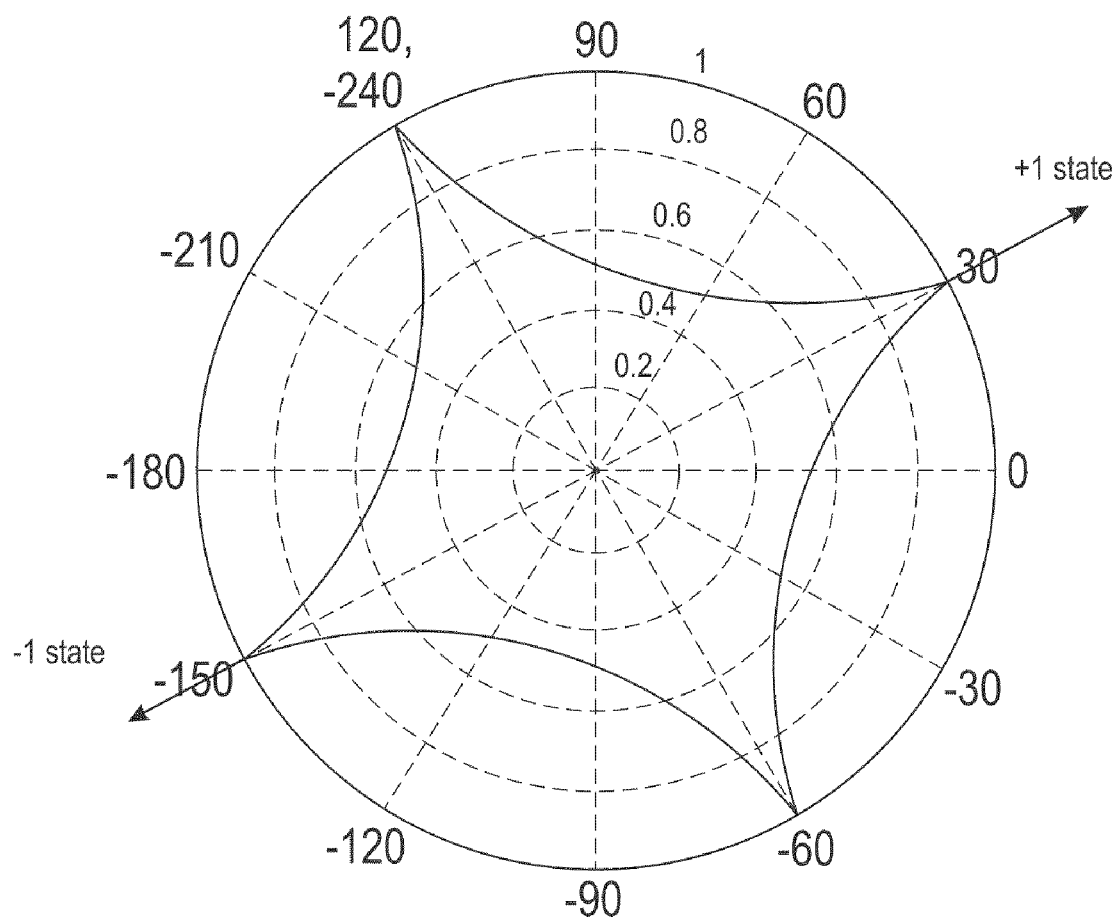
FIG. 3 depicts a Stoner-Wolfarth astroid representing the amplitude of switching field as a function of field direction related to easy axis direction along +30°, in accordance with embodiments of the present invention.

If the field (H) generated by the write head is larger than $H_{sw}(\phi)$ with $\alpha_0^* < \phi < \alpha_0^*+180$ then the resulting state is +1 (M along $\alpha_0$), wherein $\phi$ is the angle of magnetic field in the magnetic medium with respect to the X direction, wherein $\alpha_0$ denotes the tilt angle, $\alpha_t$ or $\alpha_b$, of the magnetic easy axis in the top layer or the bottom layer, respectively, and wherein $\alpha_0^*$ denotes the tilt angle, $\alpha_t^*$ or $\alpha_b^*$, of the magnetic hard axis in the top later or the bottom layer, respectively. In one embodiment, the magnetic material is characterized by the hard axis angle $\alpha_0^*$ being equal to $-90+\alpha_0$. If the field (H) is larger than $H_{sw}(\phi)$ with $\alpha_0^*-180<\phi<\alpha_0^*$, then the resulting state is -1 (M along $180+\alpha_0$). FIG. 3 (discussed infra) illustrates this with $\alpha_0=30°$ and Stoner-Wolhfarth model $H_{sw}(\phi)=H_a/[\sin^{(2/3)}(\phi-\alpha_0)+\cos^{(2/3)}(\phi-\alpha_0)]^{(3/2)}$ and $\alpha_0=\alpha_0^*+90$ used as an example of the dependence of the switching field vs. easy axis angle $\alpha_0$.

In one embodiment, the magnetic material is characterized by $|\alpha_0^*-\alpha_0|$ not being equal to 90 degrees.

FIG. 3 depicts a Stoner-Wolfarth astroid representing the amplitude of switching field as a function of field direction related to easy axis direction along +30°, in accordance with embodiments of the present invention. The hard axis angle is -60° for that model. For applied fields between [-60,120] the resulting state after all fields are switched off is +1 (along 30° direction). For fields between [-240,-60] the resulting state after all fields are switched off is -1 (along -150° direction).

As described supra, the fields created by a write head at the trailing edge have angles $\phi$ that vary from 0 to almost -90 degrees (with positive current) depending on the X position (X varying from 0 to -infinity). Moreover, the amplitude of the field decreases if the Z distance to the head increases and if the X position decreases towards-infinity, but is tuned by the write current.

From the discussion supra of FIGS. 2 and 3, the following facts (a), (b), (c), (d), (e) and (f) are deduced.

(a) For $\alpha_t^*$ between −80 and −10 degrees, and $\alpha_b^*$ between −180 and −90 degrees:

(a1) a positive write current (I1a) may be determined such that in the top layer 11, $\alpha_t^* < \phi_t < 0$ and $H_t \geq H_{sw,t}(\phi_t)$ and simultaneously in the bottom layer 12, $\alpha_b^* < \phi_b \leq 0$ and $H_b \geq H_{sw,b}(\phi_b)$, wherein $H_t$ and $H_b$ respectively denote the magnetic field strength in the top layer 11 and the bottom layer 12, and wherein $\phi_t$ and $\phi_b$ respectively denote the magnetic field direction relative to the X axis in the top layer 11 and the bottom layer 12. Then, after removal of all fields, the magnetization in top layer 11 and bottom layer 12 snaps back on the easy axis along $+\alpha_t$ and $+\alpha_b$ (state A).

(a2) a positive write current (I2a>I1a) may be determined such that: in the top layer 11, $-90 < \phi_{t<\alpha t}^*$ and $H_t \geq H_{sw,t}(\phi t)$; and in the bottom layer 12, $\alpha_b^* < \phi_b < 0$ and $H_b \geq H_{sw,b}(\phi_b)$. Then, after removal of all fields, the magnetization in both layers 11 and 12 snaps back on the easy axis along $180+\alpha_t$ for the top layer 11 and $\alpha_b$ for the bottom layer 12 (state D).

(a3) using currents of opposite polarities (−I1a and −I2a) the medium is written in the two other possible medium magnetization states (B and C respectively).

(b) For $\alpha_b^*$ between −80 and −10 degrees, and at between −180 and −90 degrees:

(b1) a positive write current (I1b) may be determined such that in the top layer 11, $\alpha_t^* < \phi_t < 0$ and $H_t \geq H_{sw,t}(\phi_t)$ and simultaneously in the bottom layer 12, $\alpha_b^* < \phi_b < 0$ and $H_b \geq H_{sw,b}(\phi_b)$. Then, after removal of all fields, the magnetization in both layers 11 and 12 snaps back on the easy axis along $+\alpha_t$ and $+\alpha_b$ (state A).

(b2) a positive write current (I2b>I1b) may be determined such that in the top layer 11, $\alpha_t^* < \phi_t < 0$ and $H_t \geq H_t(\phi_t)$ and in the bottom layer 12, $-90 < \phi_{b<\alpha b}^*$ and $H_b \geq H_{sw,b}(\phi_b)$. Then, after removal of all fields, the magnetization in both layers 11 and 12 snaps back on the easy axis along at for the top layer 11 and $180+\alpha_b$ for the bottom layer 12 (state C).

(b3) using currents of opposite polarities (−I1b and −I2b) the medium is written in the two other possible medium magnetization states (states B and D respectively).

c) For $\alpha_t^*$ between −80 and −10 degrees, and $\alpha_b^*$ between −90 and 0 degrees that satisfies $\alpha_b^* < \phi_b < 0$ with $H_b \geq H_{sw,b}(\phi_b)$ at I2c everywhere in the bottom layer 12:

(c1) a positive write current (I1c) may be determined such that in the top layer 11, $\alpha_t^* < \phi_t < 0$ and $H_t \geq H_{sw,t}(\phi t)$ and simultaneously in the bottom layer 12, $\alpha_b^* < \phi_b < 0$ and $H_b \geq H_{sw,b}(\phi_b)$. Then, after removal of all fields, the magnetization in both layers 11 and 12 back on the easy axis along $+\alpha_t$ and $+\alpha_b$ (state A).

(c2) a positive write current (I2c>I1c) may be determined such that in the top layer 11, $-90 < \phi_{t<\alpha t}^*$ and $H_t \geq H_{sw,t}(\phi t)$ and in the bottom layer 12, $\alpha_b^* < \phi_b^* < 0$ and $H_b \geq H_{sw,b}(\phi_b)$. Then, after removal of all fields, the magnetization in both layers 11 and 12 snaps back on the easy axis along $180+\alpha_t$ for the top layer 11 and $\alpha_b$ for the bottom layer 12 (state D).

(c3) using currents of opposite polarities (−I1c and −I2c) the medium is written in the two other possible medium magnetization states (B and C respectively).

d) For $\alpha_b^*$ between −80 and −10 degrees, and $\alpha_t^*$ between −90 and 0 degrees that satisfies $\alpha_t^* < \phi_t < 0$ and $H_t \geq H_{sw,t}$ at I2d everywhere in the top layer 11:

(d1) a positive write current (I1d) may be determined such that in the top layer 11, $\alpha_t^* < \phi_t < 0$ and $H_t \geq H_{sw,t}(\phi_t)$ and simultaneously in the bottom layer 12, $\alpha_b^* < \phi_b < 0$ and $H_b \geq H_{sw,b}$ ($\phi_b$). Then, after removal of all fields, the magnetization in both layers 11 and 12 snaps back on the easy axis along $+\alpha_t$ and $+\alpha_b$ (state A).

(d2) a positive write current (I2d>I1d) may be determined such that in the top layer 11, $\alpha_t^* < \phi_t < 0$ and $H_t \geq H_{sw,t}(\phi t)$ and in the bottom layer 12, $-90 < \phi_{b<\alpha b}^*$ and $H_b \geq H_{sw,b}(\phi_b)$. Then, after removal of all fields, the magnetization in both layers 11 and 12 snaps back on the easy axis along at for the top layer 11 and $180+\alpha_b$ for the bottom layer 12 (state C).

(d3) using currents of opposite polarities (−I1d and −I2d) the medium is written in the two other possible medium magnetization states (states B and D respectively).

e) For at between −80 and −10 degrees, and $\alpha_b^*$ between −90 and 0 degrees that satisfies $\alpha_b^* < \phi_b < 0$ with $H_b \geq H_{sw,b}(\phi_b)$ at I2e everywhere in the bottom layer 12:

(e1) a positive write current (I1e) may be determined such that in the top layer 11, $-90 < \phi_{t<\alpha t}^*$ and $H_t \geq H_{sw,t}(\phi_t)$ and simultaneously in the bottom layer 12, $-90 < \phi_{b<\alpha b}^*$ and $H_b \geq H_{sw,b}(\phi_b)$. Then, after removal of all fields, the magnetization in both layers 11 and 12 back on the easy axis along $180+\alpha_t$ and $180+\alpha_b$ (state B).

(e2) a positive write current (I2e<I1e) may be determined such that in the top layer 11, $-90 < \phi_{t<\alpha t}^*$ and $H_t \geq H_{sw,t}(\phi_t)$ and in the bottom layer 12, $\alpha_b^* < \phi_b < 0$ and $H_b \geq H_{sw,b}(\phi_b)$. Then, after removal of all fields, the magnetization in both layers 11 and 12 snaps back on the easy axis along $180+\alpha_t$ for the top layer 11 and $\alpha_b$ for the bottom layer 12 (state D).

(e3) using currents of opposite polarities (−I1e and −I2e) the medium is written in the two other possible medium magnetization states (A and C respectively).

f) For $\alpha_b^*$ between −80 and −10 degrees, and at between −90 and 0 degrees that satisfies $\alpha_t^* < \phi_t < 0$ and $H_t \geq H_{sw,t}(\phi_t)$ at I2f everywhere in the top layer 11:

(f1) a positive write current (I1f) may be determined such that in the top layer 11, $-90 < \phi_t < \alpha_t^*$ and $H_t \geq H_{sw,t}(\phi_t)$ and simultaneously in the bottom layer 12, $-90 < \phi_{b<\alpha b}^*$ and $H_b \geq H_{sw,b}(\phi_b)$. Then, after removal of all fields, the magnetization in both layers 11 and 12 back on the easy axis along $180+\alpha_t$ and $180+\alpha_b$ (state B).

(f2) a positive write current (I2f<I1f) may be determined such that in the top layer 11, $\alpha_t^* < \phi_t < 0$ and $H_t \geq H_{sw,t}(\phi_t)$ and in the bottom layer 12, $-90 < \phi_{b<\alpha b}^*$ and $H_b \geq H_{sw,b}(\phi_b)$. Then, after removal of all fields, the magnetization in both layers 11 and 12 snaps back on the easy axis along at for the top layer 11 and $180+\alpha_b$ for the bottom layer 12 (state C).

(f3) using currents of opposite polarities (−I1f and −I2f) the medium is written in the two other possible medium magnetization states (states A and D respectively).

In one embodiment, $\alpha_t \neq \alpha_b$.
In one embodiment, $|\alpha_t| \neq |\alpha_b|$.
In one embodiment, $-80 \leq \alpha_t^* \leq -10$ and $-180 < \alpha_b^* < -90$.
In one embodiment, $-180 < \alpha_t^* < -90$ and $-80 \leq \alpha_b^* \leq -10$.
In one embodiment, $-80 \leq \alpha_t^* \leq -10$ and $-90 \leq \alpha_b^* < 0$.
In one embodiment, $-90 < \alpha_t^* < 0$ and $-80 \leq \alpha_b \leq -10$.

Figure 4A:
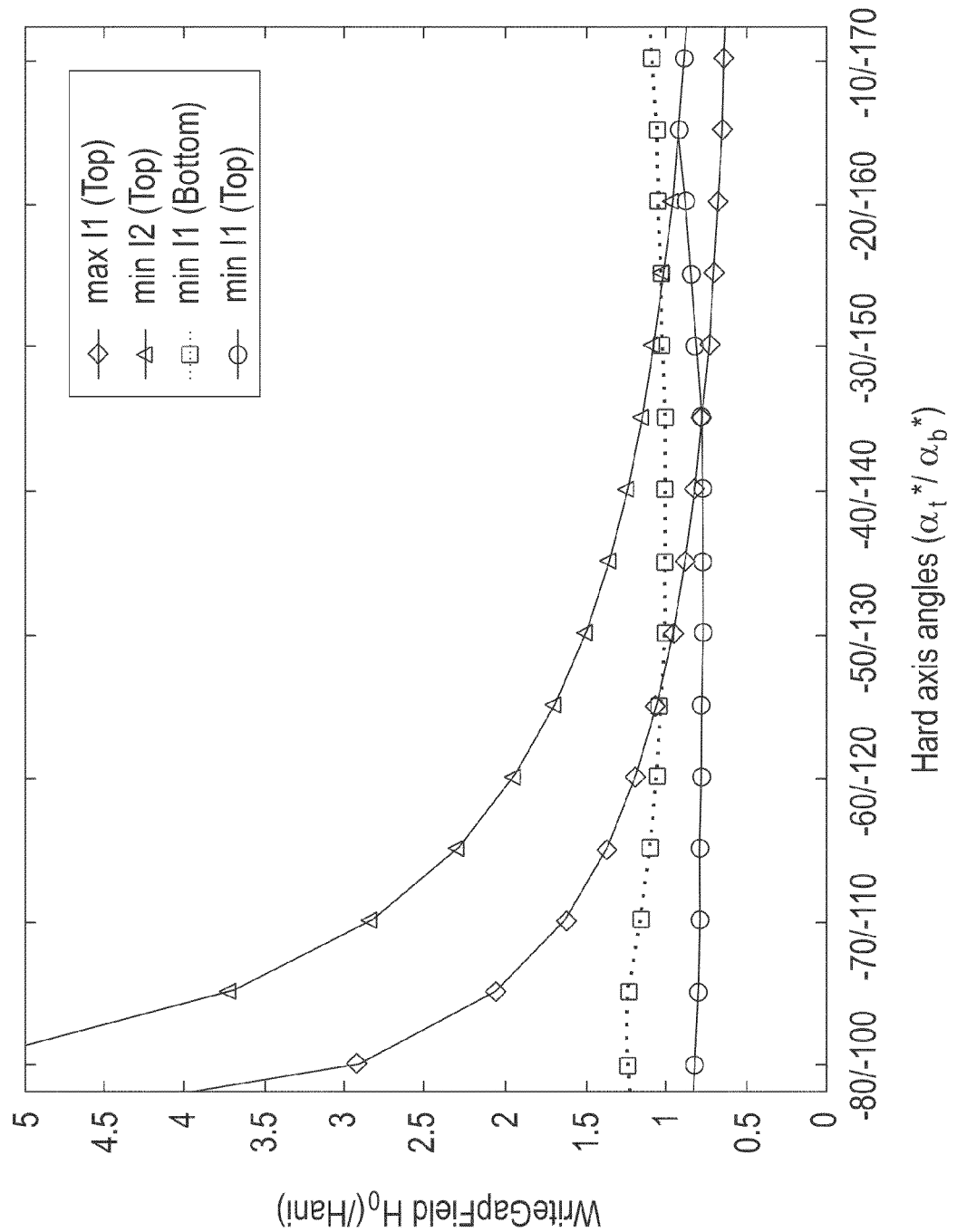
Figure 4B:
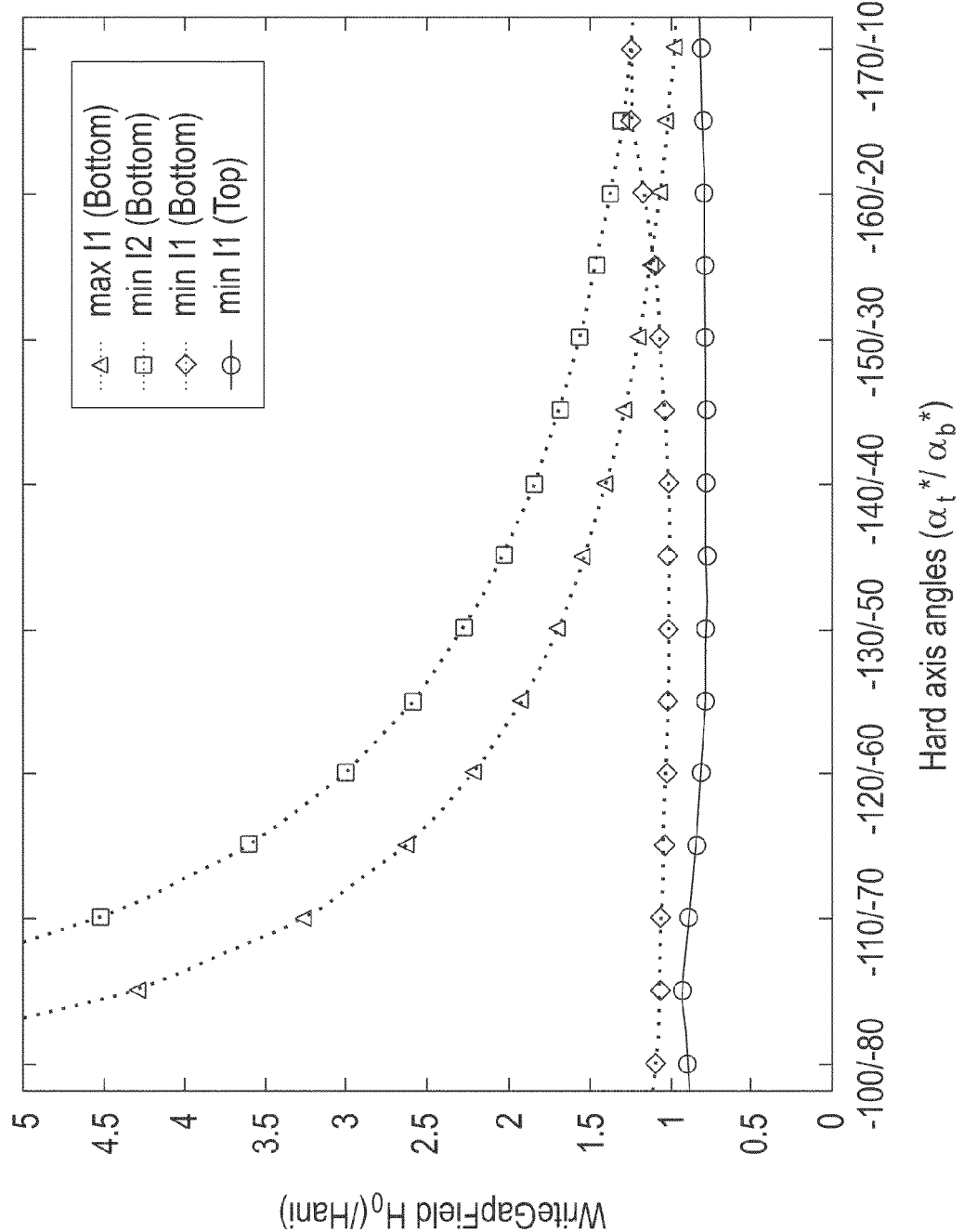
Figure 4C:
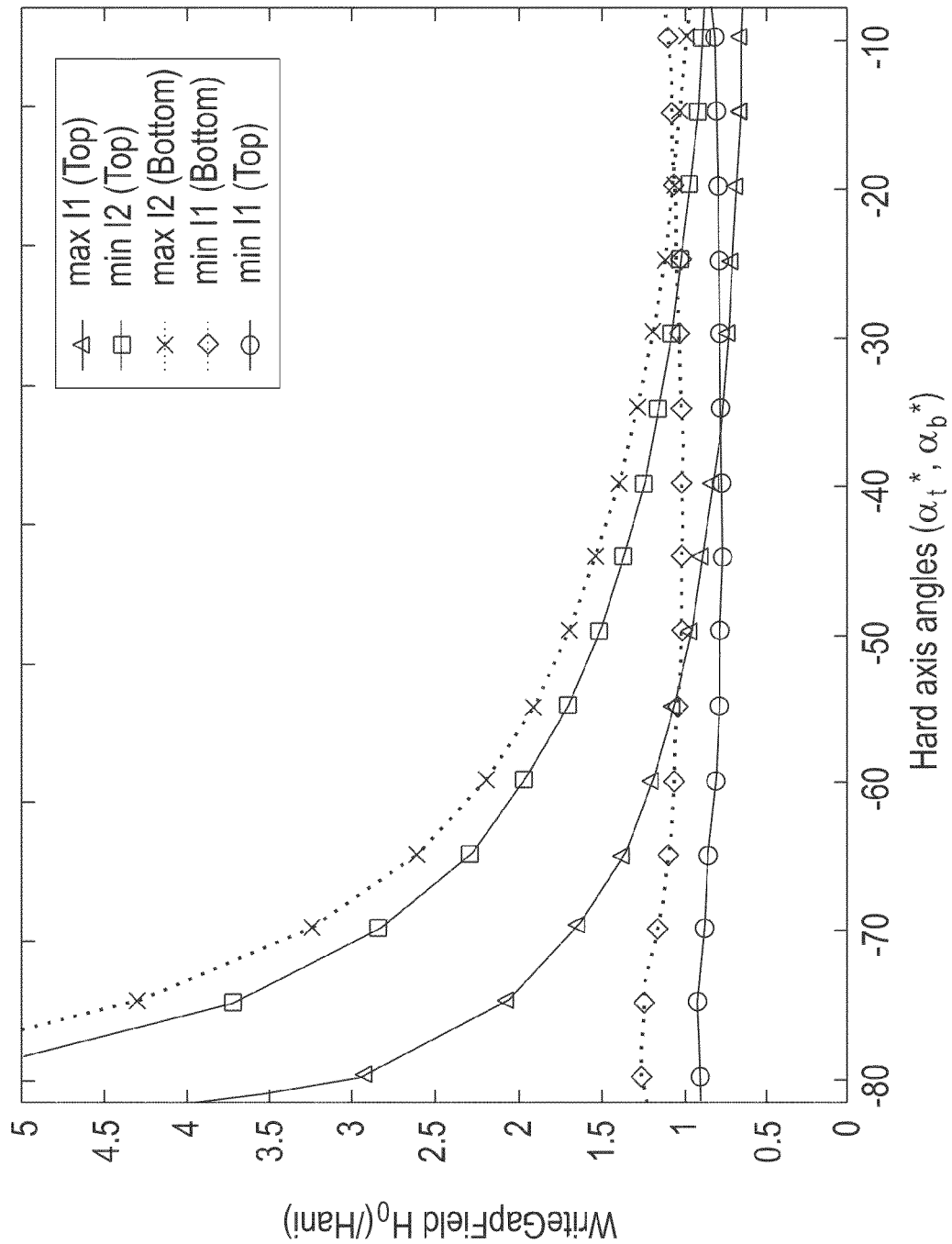
Figure 4E:
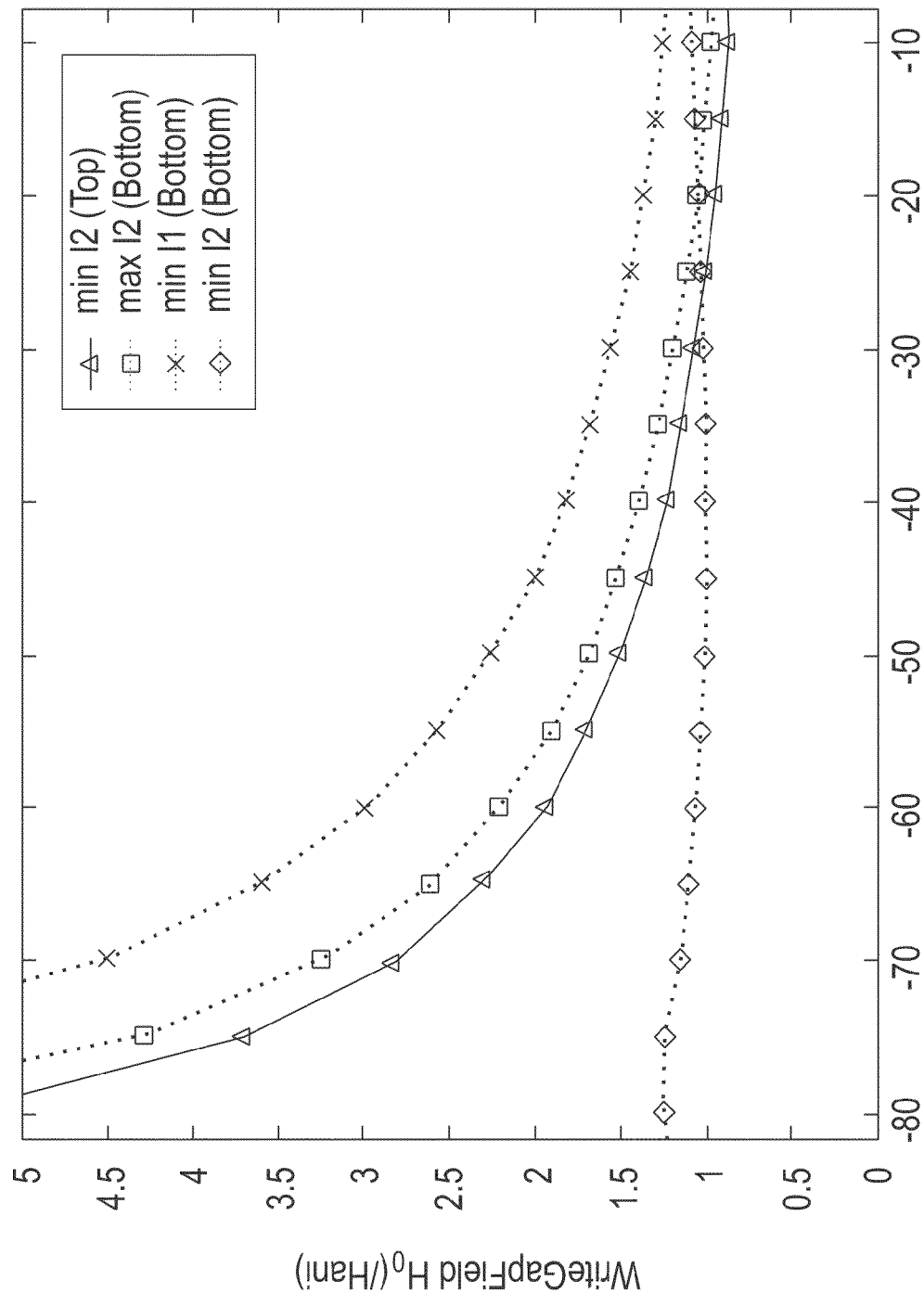
Figure 4F:
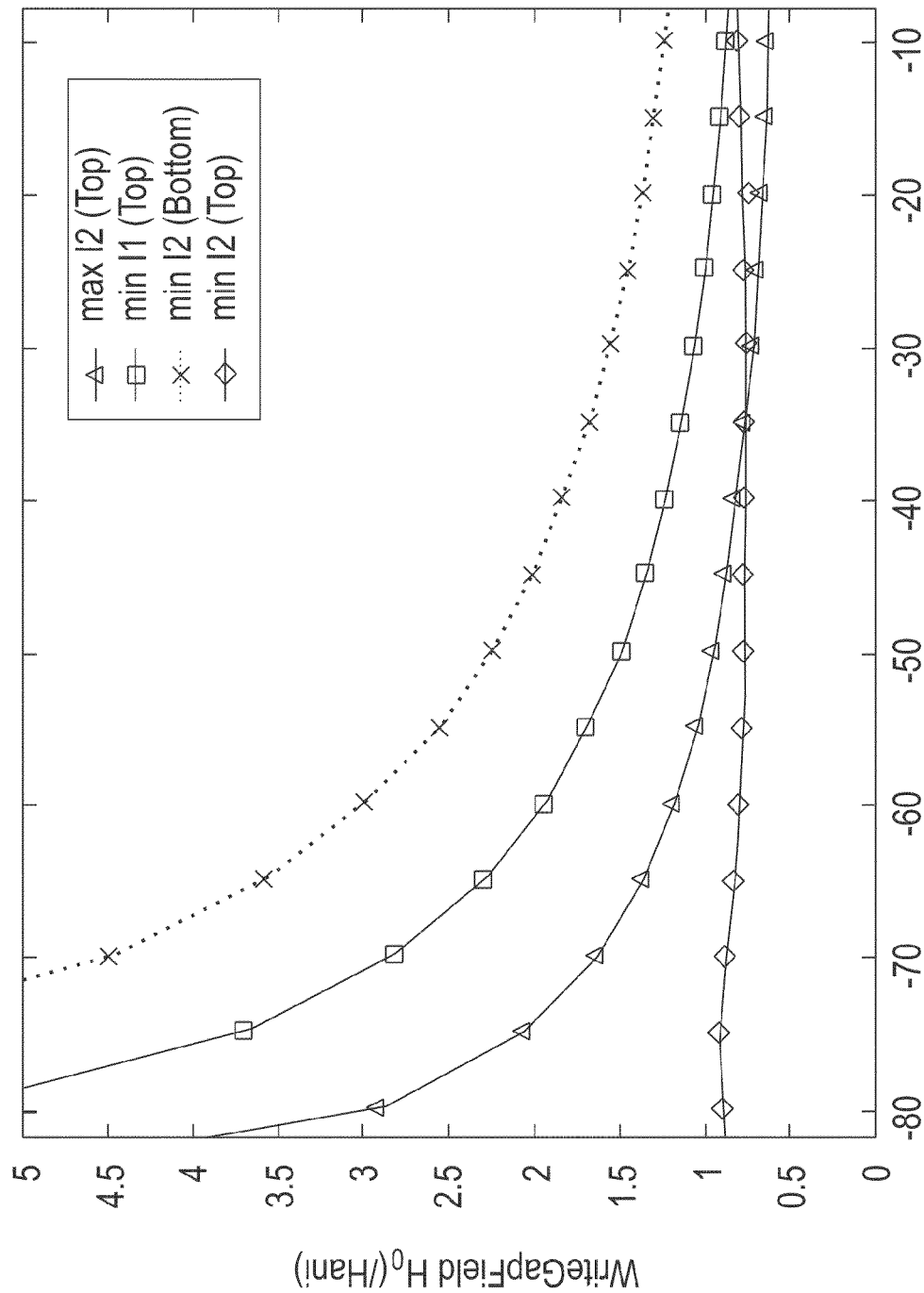
Figure 5A:
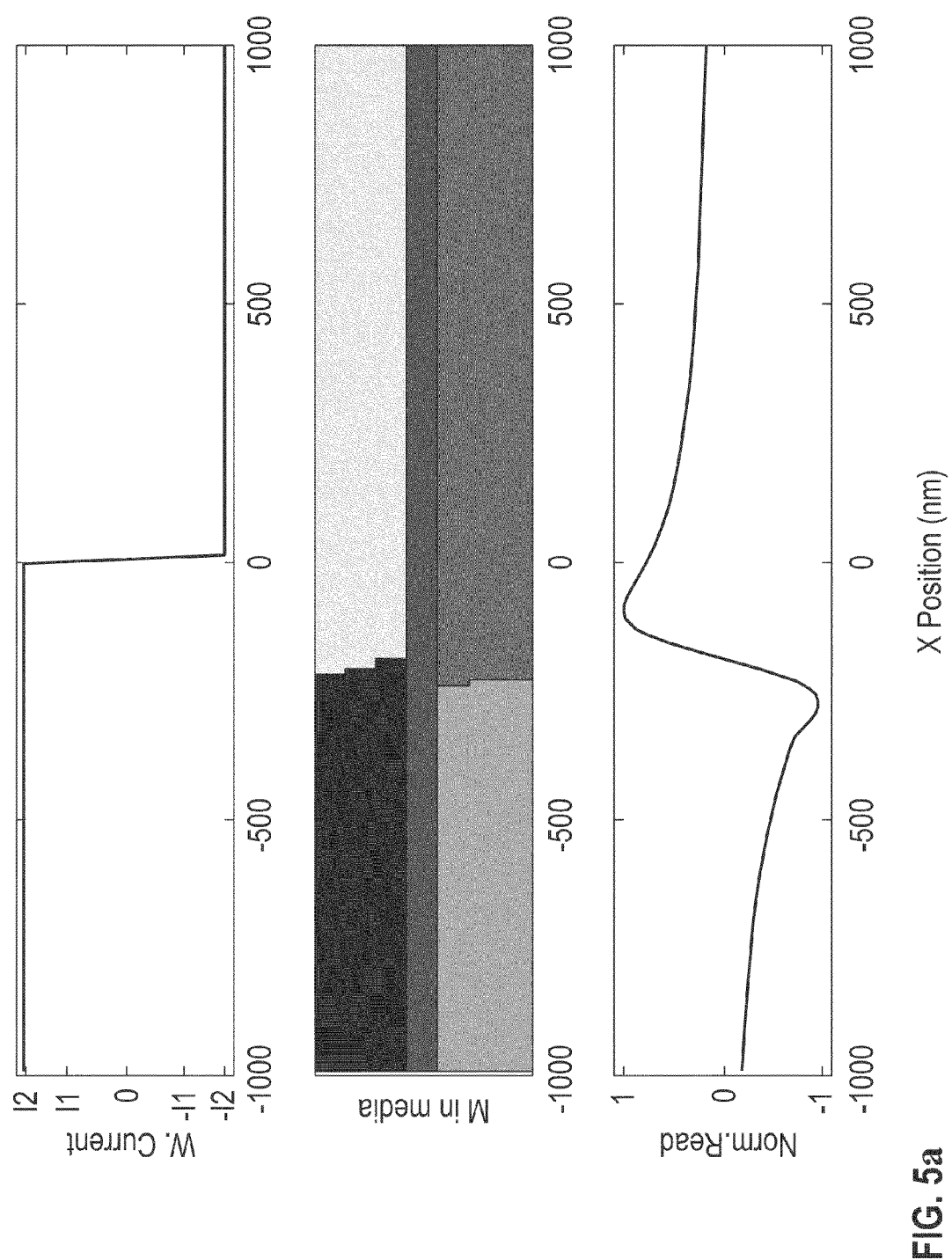
Figure 5B:
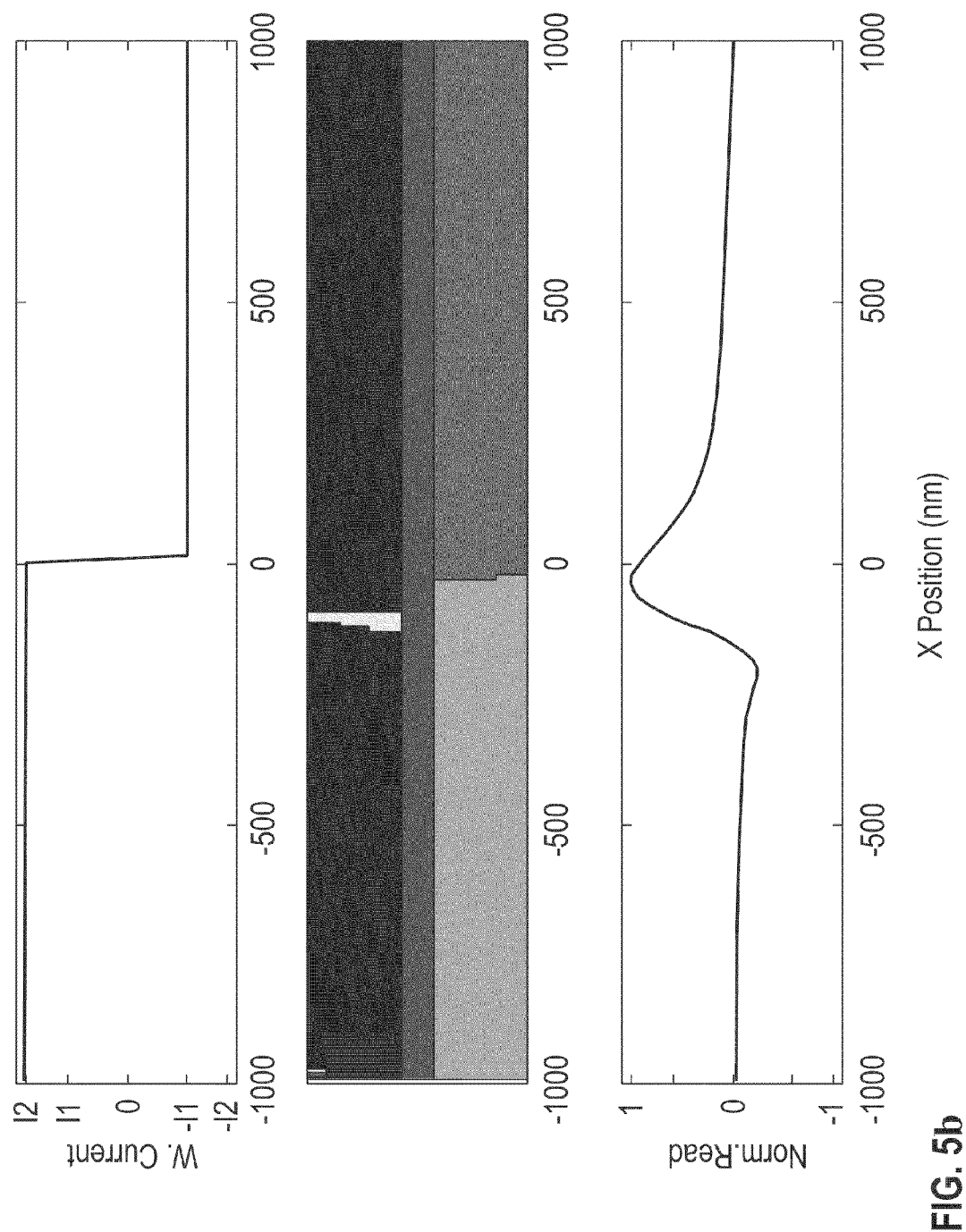
Figure 5C:
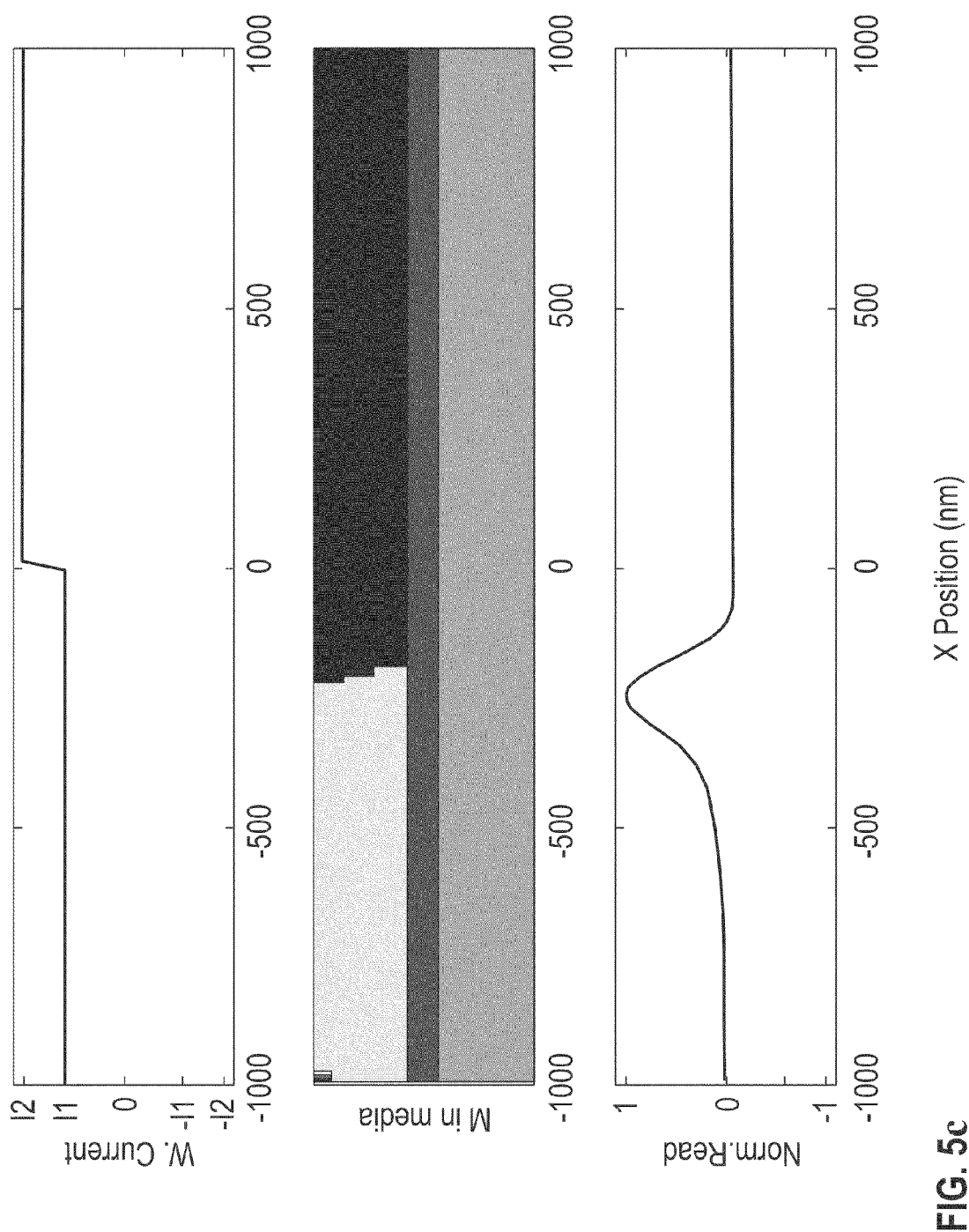
Figure 5D:
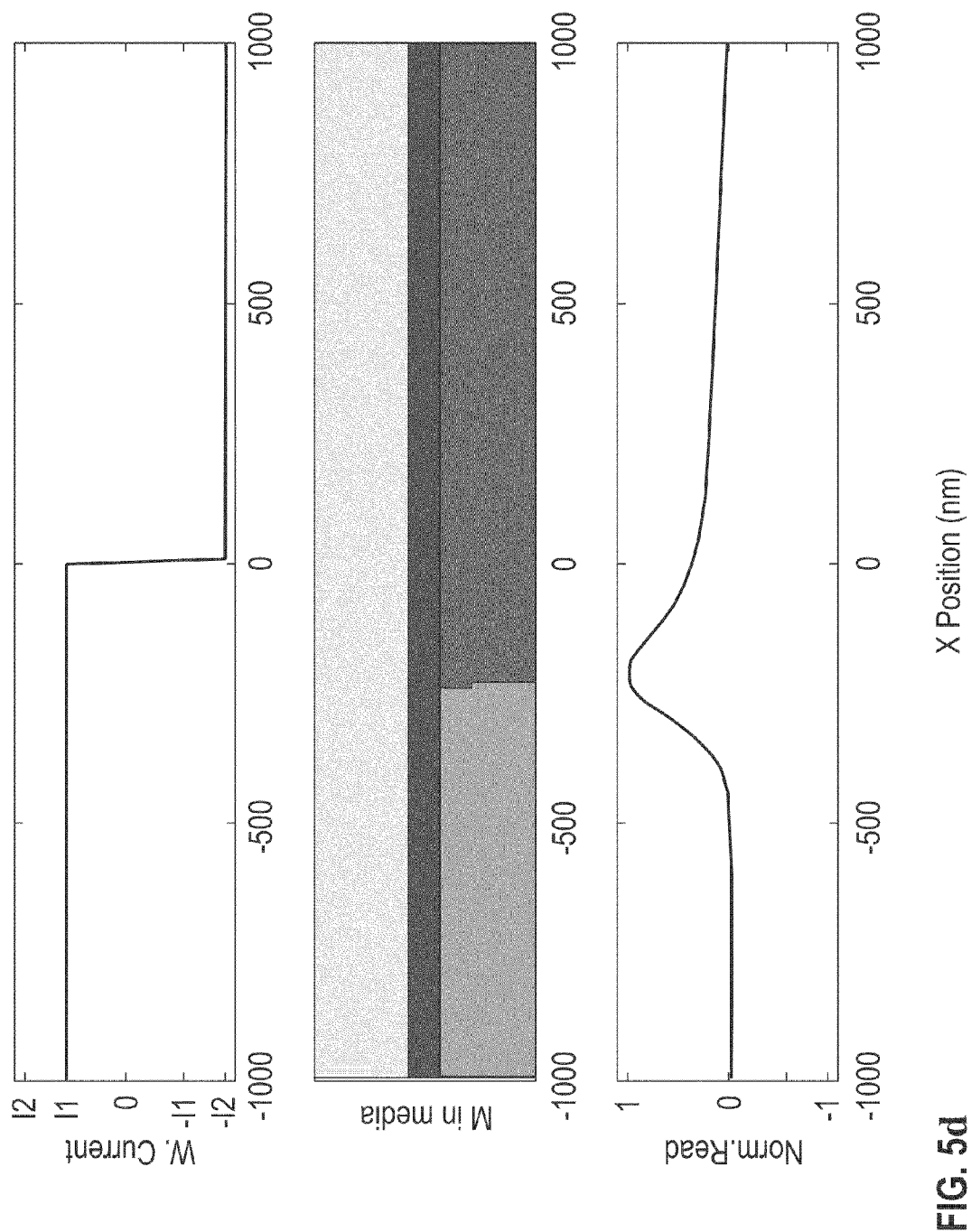
Figure 5E:
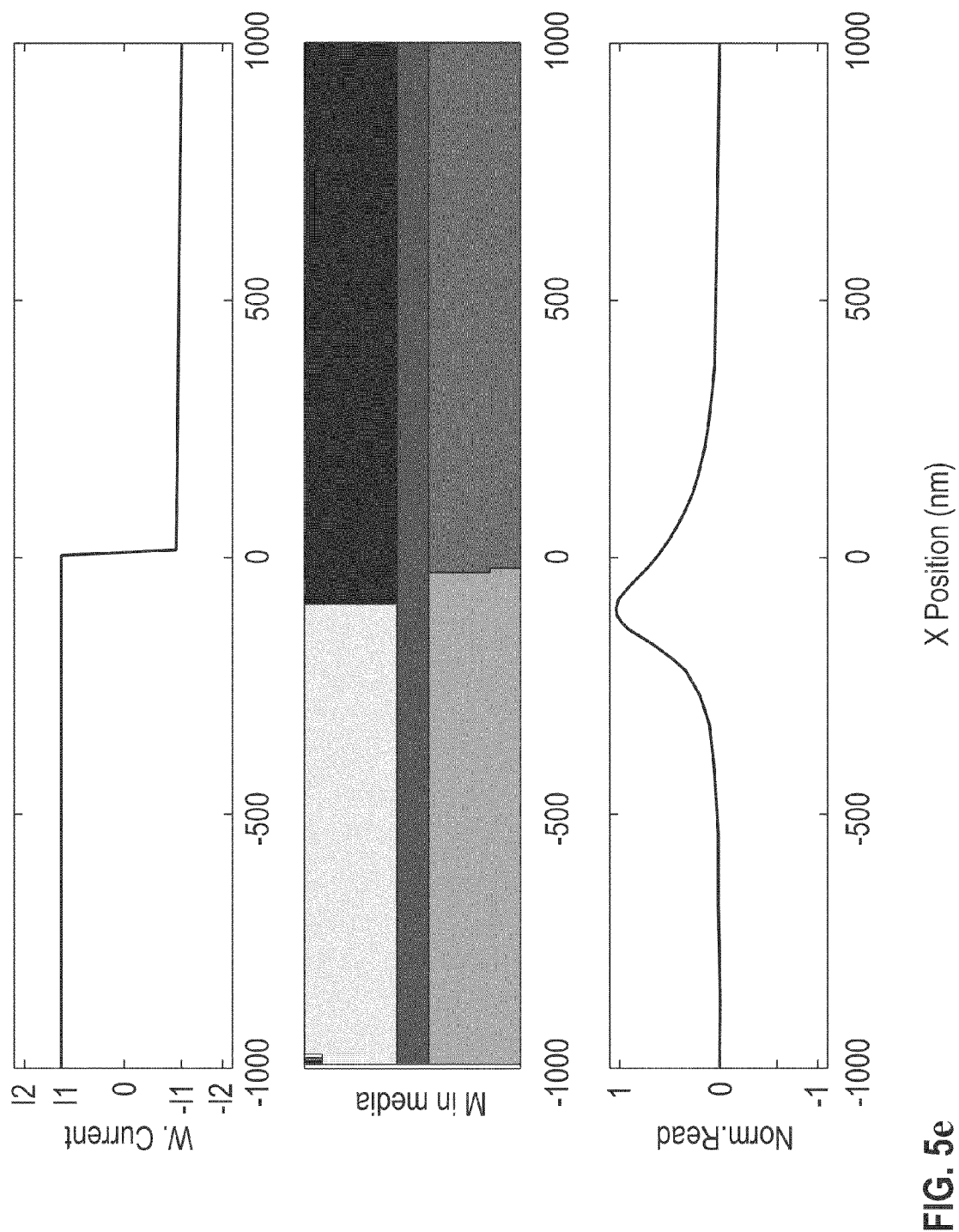
Figure 5F:
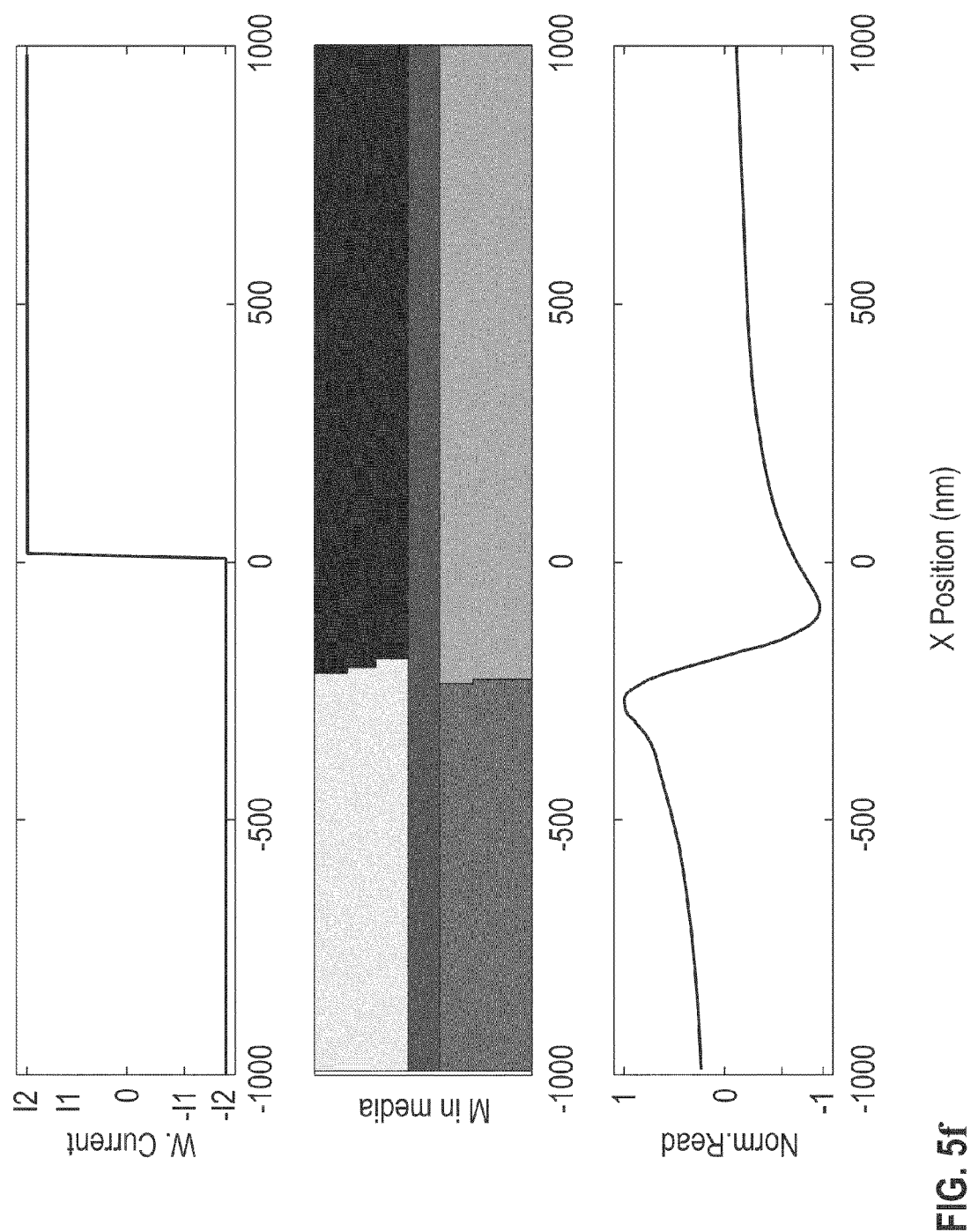
Figure 5G:
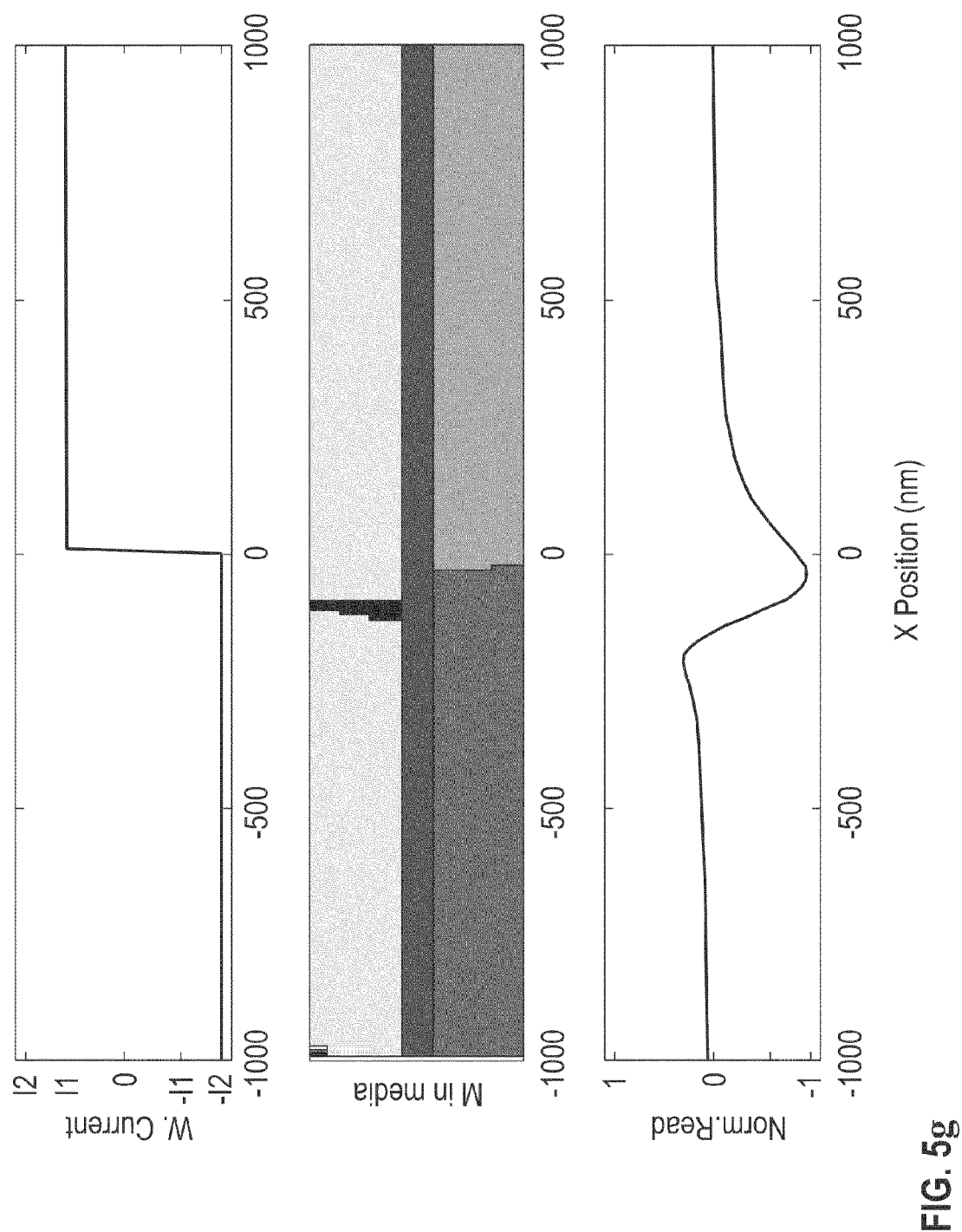
Figure 5H:
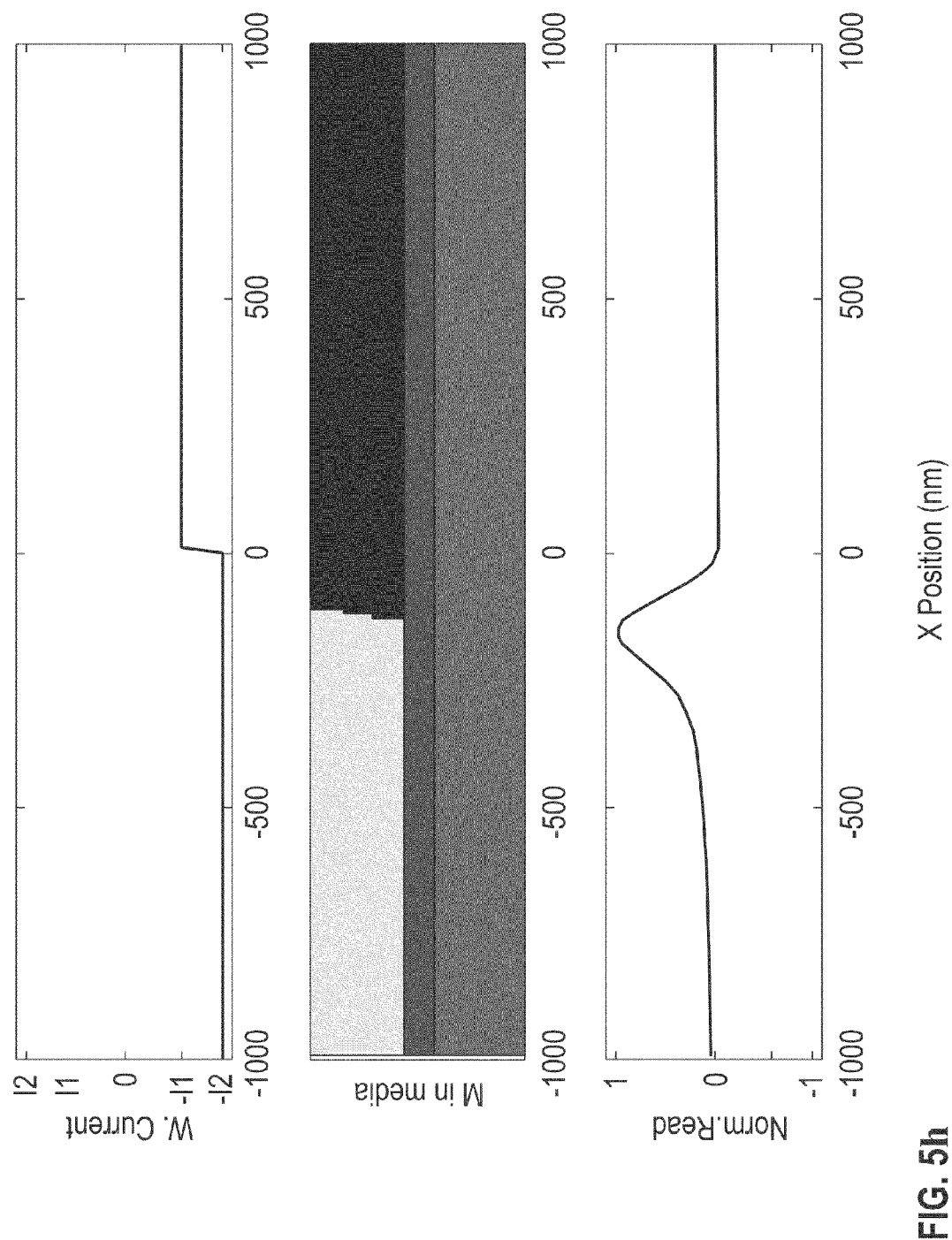
Figure 5I:
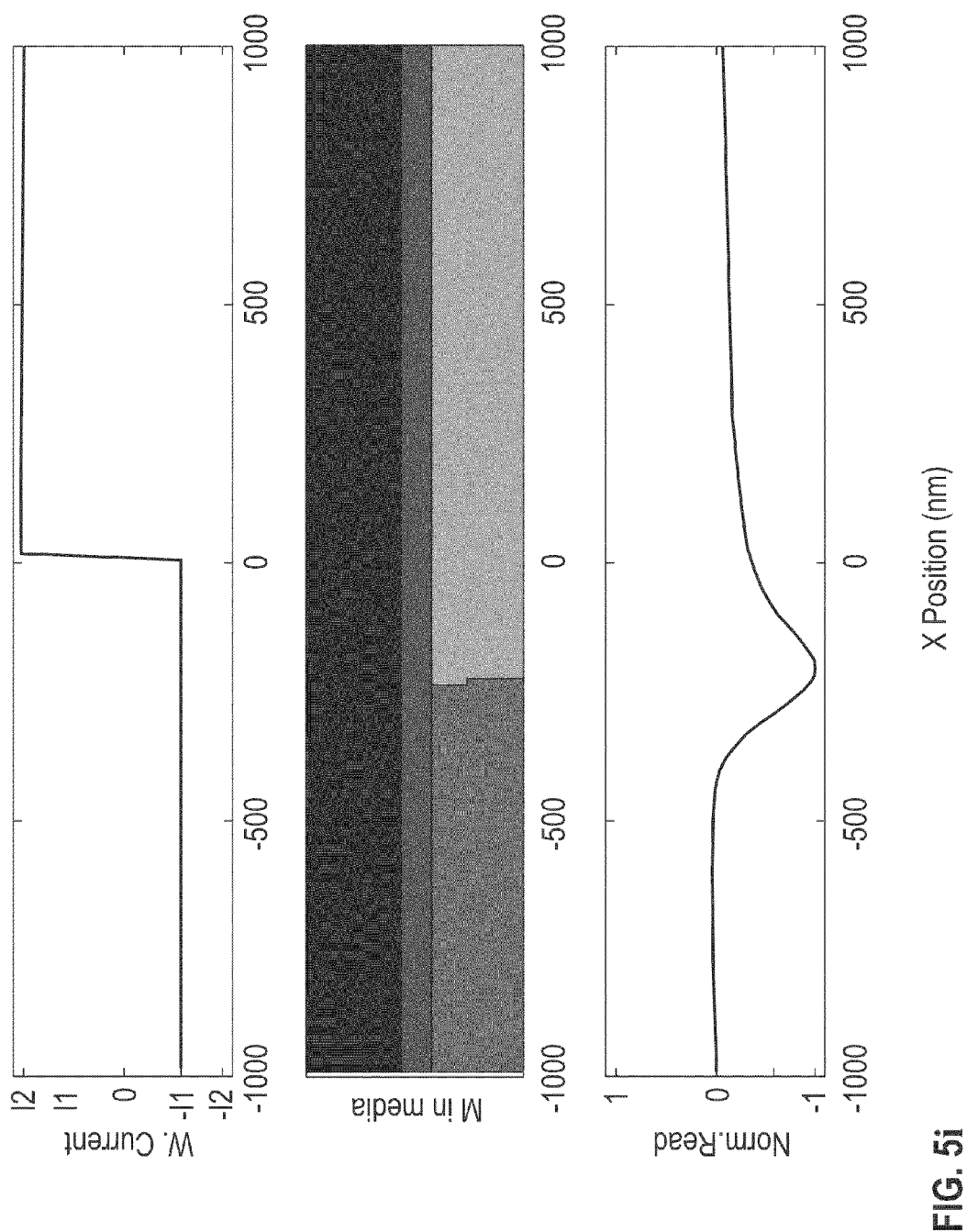
Figure 5J:
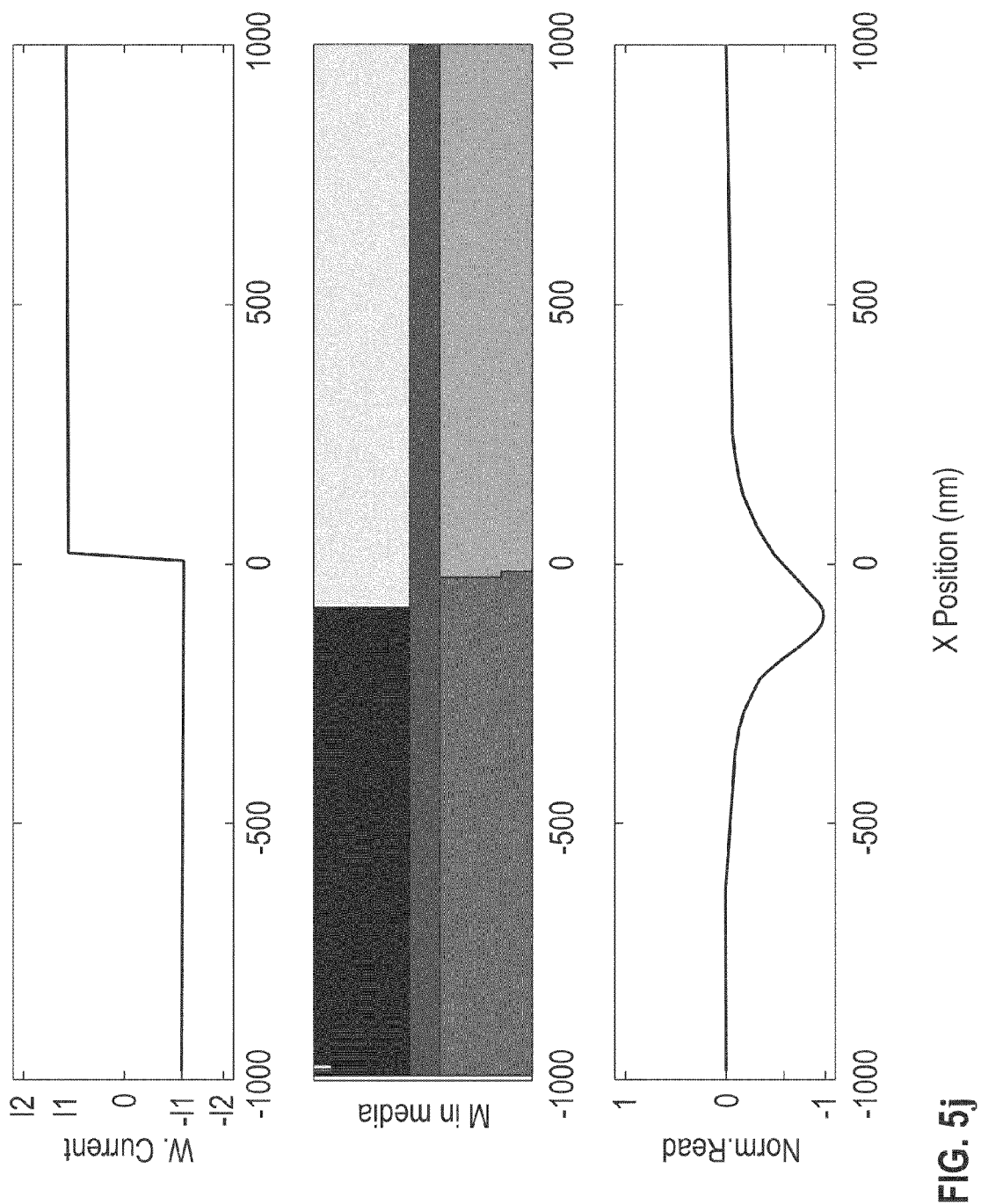
Figure 5K:
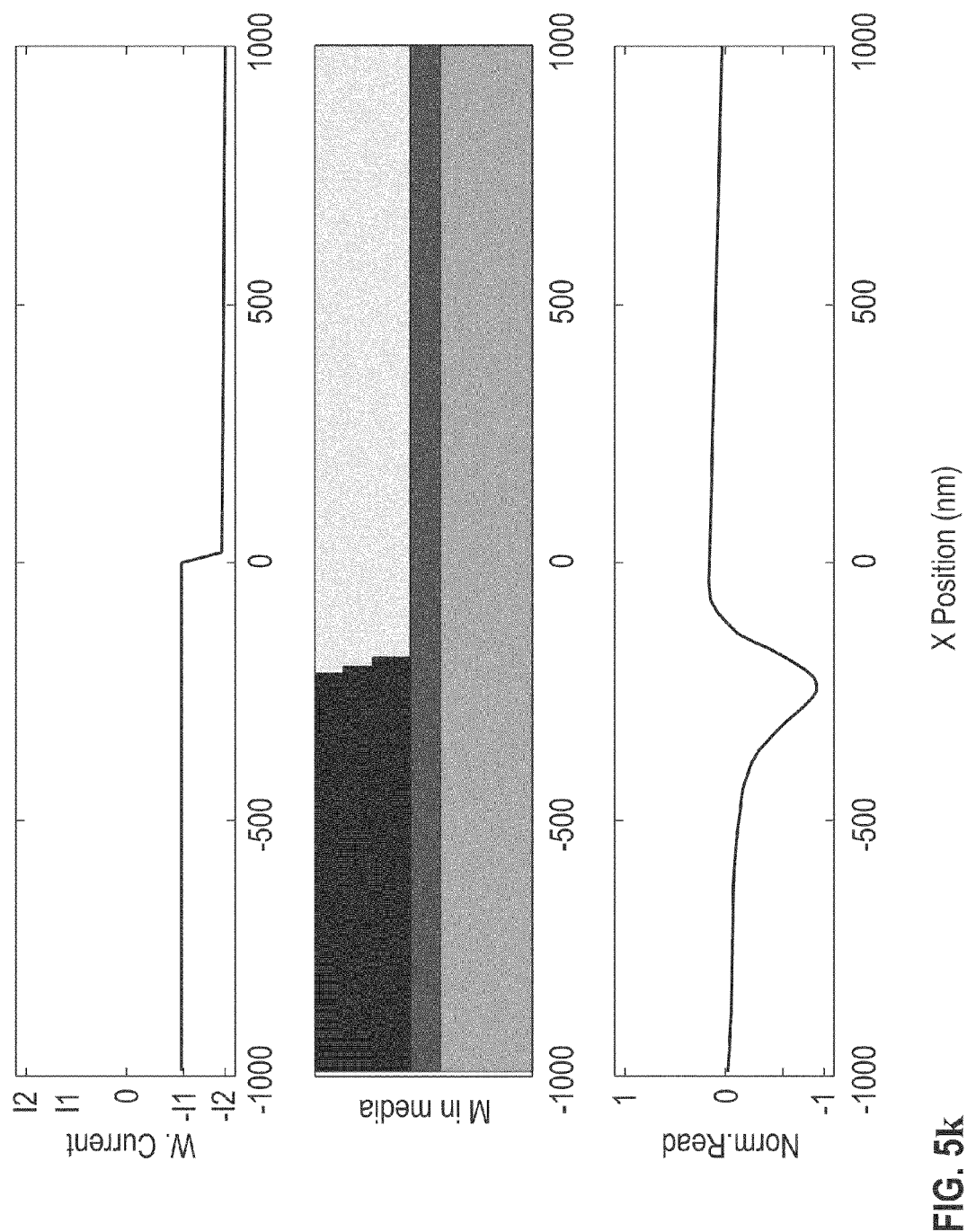
Figure 5I:
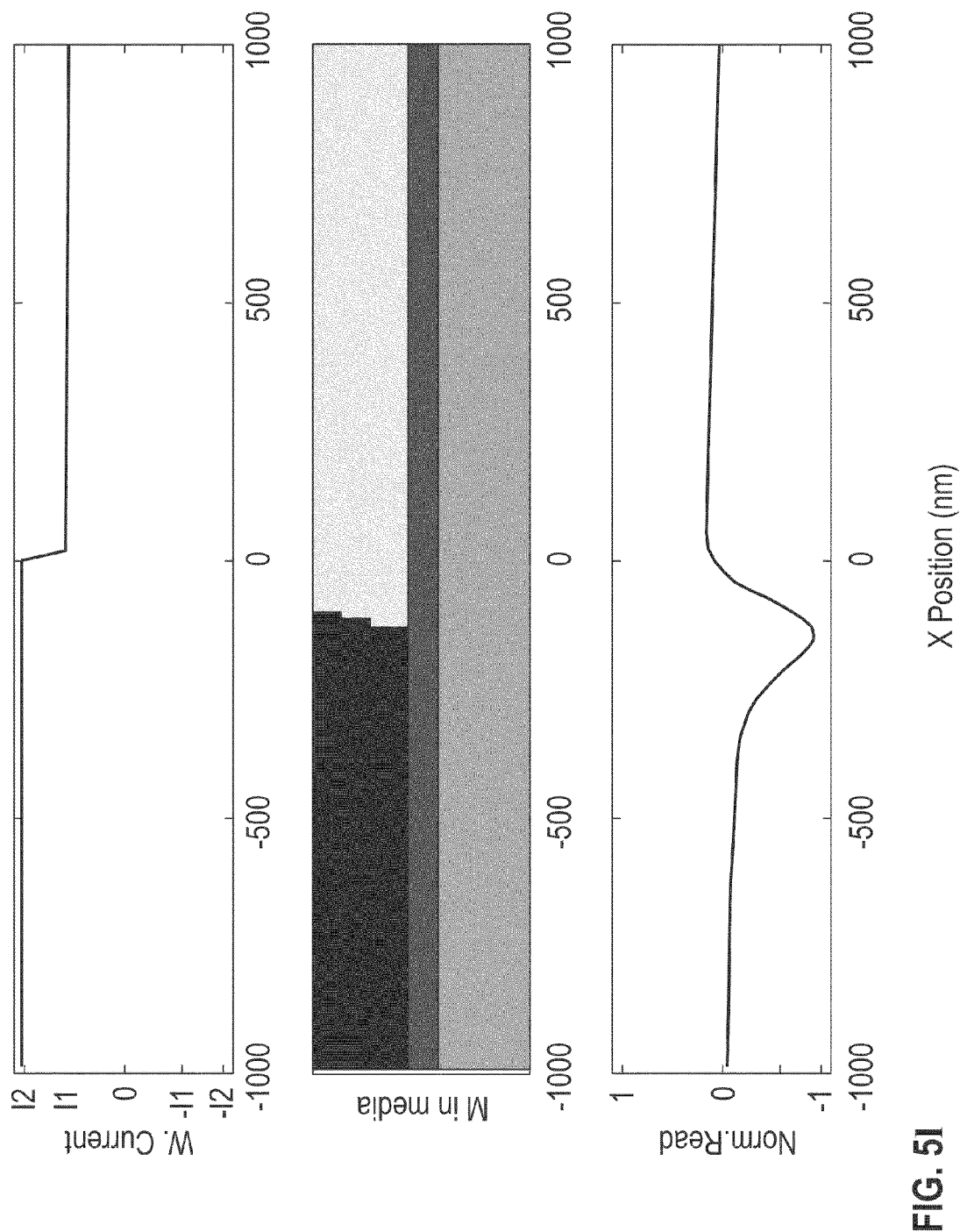

FIGS. 4A, 4B, 4C, 4D, 4E, and 4F (collectively, "FIG. 4") show a calculation of the write current (I1 and I2) for the multi-layer continuous magnetic media for various ranges of hard axis angle in the top and bottom layers, in accordance with embodiments of the present invention. In FIG. 4, the magnetic medium comprises 30 nm thick top and bottom layers, a 10 nm thick spacer layer, a head-media spacing of 30 nm, and a write gap of 200 nm. Karlqvist head fields have been used to calculate the stray field from the write head. In FIG. 4, the deep gap field (which is directly proportional to the write current) is normalized to the anisotropy fields of each layer. Each layer can have different anisotropy fields. The calculation of I1 and I2 write currents or corresponding deep-gap fields (normalized to each layer anisotropy field) allow the top and bottom layer of the medium to be written independently as a function of the hard angle absolute value of $\alpha_t^*$ (solid lines) and $\alpha_b^*$ (dotted lines). In FIG. 4A, $\alpha_t^*$ is between −80 and −10 degrees, and $\alpha_b^*$ is between −180 and −90 degrees. In FIG. 4B, $\alpha_b^*$ is between −80 and −10 degrees, and $\alpha_t$ is between −180 and −90 degrees. In FIG. 4C, at is between −80 and −10 degrees, and $\alpha_b^*$ is between −90 and 0 degrees. In FIG. 4D, $\alpha_b^*$ is between −80 and −10 degrees, and $\alpha_t^*$ is between −90 and 0 degrees. In FIG. 4E, $\alpha_t^*$ is between −80 and −10 degrees, and $\alpha_b^*$ is between −90 and 0 degrees. In FIG. 4F, $\alpha_b^*$ is between −80 and −10 degrees, and $\alpha_t^*$ is between −90 and 0 degrees.

With respect to forward and backward recording directions, if $\alpha_t^*$ is between −80 and −10 degrees, and $\alpha_b^*$ is between −170 and −100 degrees, then the two-level medium can be written simultaneously at the two depths of the medium and independently of the recording direction. In the forward direction (head moving in the +X direction), the medium is written into the A, B, C, or D magnetization state using current I1a, I2a, −I1a or −I2a. In the backward direction (head moving in the −X direction), the angles are reversed and the 4 data magnetization states are written using current I1b, I2b, −I1b and −I2b.

Additionally with respect to forward and backward recording directions, if $\alpha_t^*$ is between −170 and −100 degrees, and $\alpha_b^*$ is between −80 and −10 degrees, then the two-level medium can be written simultaneously at the two levels of the medium and independently of the recording direction. In the forward direction (head moving in the +X direction), the medium is written into the A, B, C, or D magnetization state using current I1b, I2b, −I1b or −I2b. In the backward direction (head moving in the −X direction), the angles are reversed and the 4 magnetization states are written using current I1a, I2a, −I1a and −I2a.

For reading two levels of bits of the medium, the magnetic read head 31 in FIG. 6A (or the magnetic read head 36 of FIG. 6C or FIG. 6D) performs reading such as by using a conventional reading sensor (e.g., a magnetoresistive head) that passes above the medium at a given velocity and with a given head-media spacing.

The readback pulse shape actually measures a transition between consecutive magnetization states [S1, S2] at a position $x_{12}$ in the media along the X axis, such that right before the transition position $x_{12}$ the media is written in the magnetization state S1 and right after the transition position $x_{12}$ the media is written in the magnetization state S2. The four magnetization states (A, B, C, D) that can be written in the media corresponds 12 different transitions (a)-(l) corresponding to the preceding transition as depicted infra in Table 1 Table 1 depicts the 12 different magnetization state transitions that can be written in the medium as combinations of magnetizations ($\alpha_t$, $\alpha_b$, 180+$\alpha_t$, 180+$\alpha_b$) for each layer, using currents I1, I2, −I1, and −I2. The 12 magnetization state transitions are denoted as transitions (a), (b), (c), (d), (e), (f), (g), (h), (i), (j), (k), and (l). For example, transition (d) is a transition from magnetization state A (+1/+1) triggered by current +I1 to magnetization state C (+1,−1) triggered by current −I2.

TABLE 1

| From | To | | | |
|---|---|---|---|---|
| | A (+1/+1) (+I1) | C (+1/−1) (−I2) | D (−1/+1) (+I2) | B (−1/−1) (−I1) |
| A (+1/+1) (+I1) | — | (d) A to C | (c) A to D | (e) A to B |
| C (+1/−1) (−I2) | (g) C to A | — | (f) C to D | (h) C to B |
| D (−1/+1) (+I2) | (l) D to A | (a) D to C | — | (b) D to B |
| B (−1/−1) (−I1) | (j) B to A | (k) B to C | (i) B to D | — |

FIGS. 5a-5l (collectively, "FIG. 5") depict the 12 magnetization state transitions (a)-(l), respectively, of Table 1 for a particular example, in accordance with embodiments of the present invention. The magnetization state transitions in FIG. 5 are characterized by: $\alpha_t$=+30° and $\alpha_b$=−30°, $\alpha_t^*$=−60° and $\alpha_b^*$=−120°, with same anisotropy field $H_{a,t}$=$H_{a,b}$ for the top and bottom layers, $T_t$=30 nm, $T_b$=30 nm, 10 nm thick spacer, a head-media spacing of 30 nm and a write gap of 200 nm. Then I1 can be 1.17·$H_{a,t}$ and I2 can be 2·$H_{a,t}$.

For each magnetization state transition in FIG. 5, graphs labeled "W. Current", "M in media", and "Norm Read" are shown. "W. Current" is the write current (±I$_1$, ±I$_2$) as a function of the position (X) of the write magnetic head above the medium. "M in media" denotes the magnetization state (±1) in the top layer and in the bottom layer in the medium as indicated in the legend. "Norm Read" is the readback pulse shape (after being normalized to fall within ±1) for the magnetization state transition.

For reading two layers of bits of the continuous medium, the magnetic read head 31 in FIG. 6 (or the magnetic read head 36 of FIG. 6C or FIG. 6D) performs reading such as by using a conventional reading sensor (e.g., a magnetoresistive head) that passes above the medium at a given velocity and with a given head-media spacing.

Figure 7:
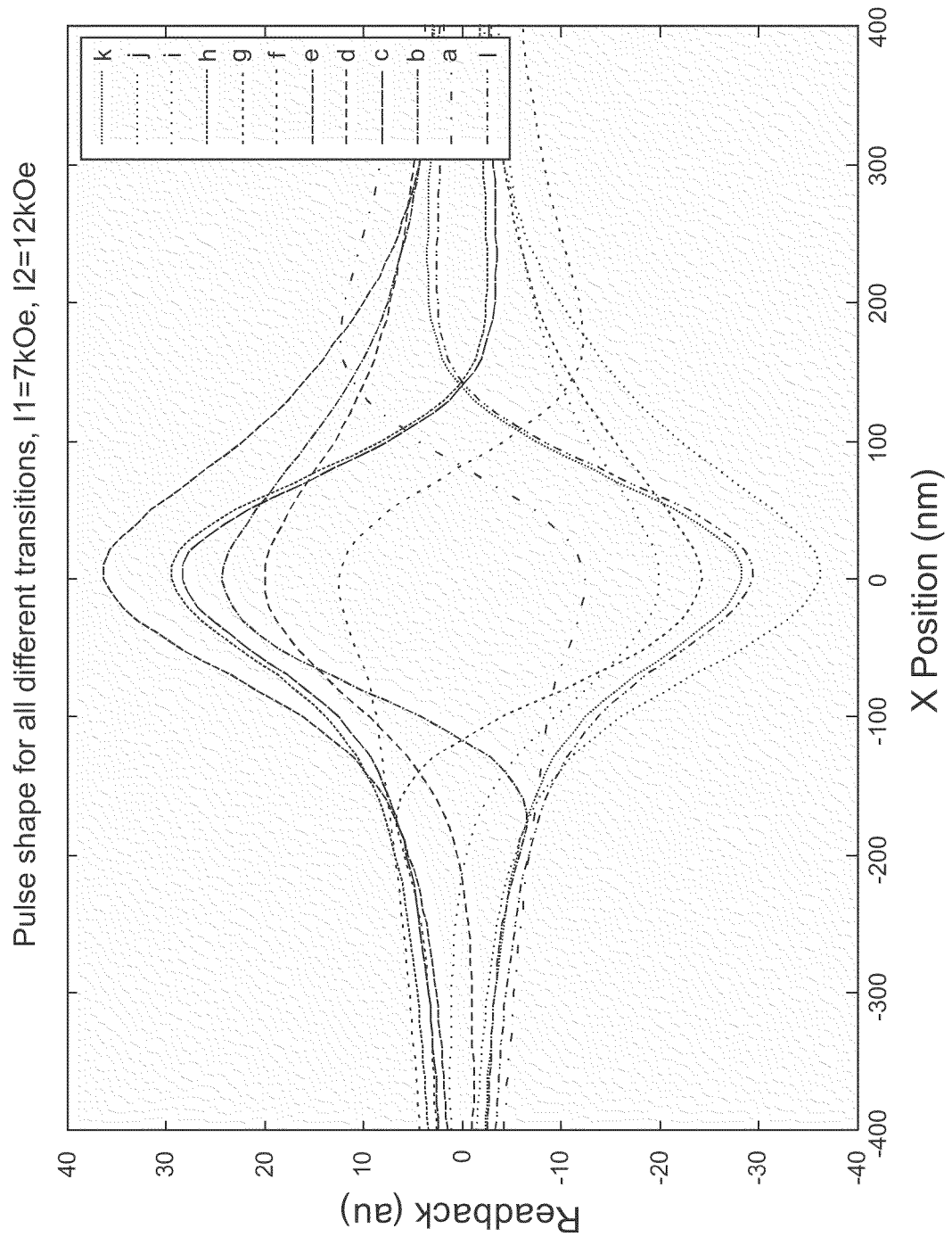
FIG. 7 depicts the readback pulse shapes of the 12 magnetization state transitions of FIGS. 5a-5l together in one graphical plot, in accordance with embodiments of the present invention.

FIG. 7 depicts the readback pulse shapes of the 12 magnetization state transitions of FIG. 5 together in one graphical plot, in accordance with embodiments of the present invention. These readback pulse shapes are symmetric by pairs (positive pulse and negative pulse).

Figure 8:
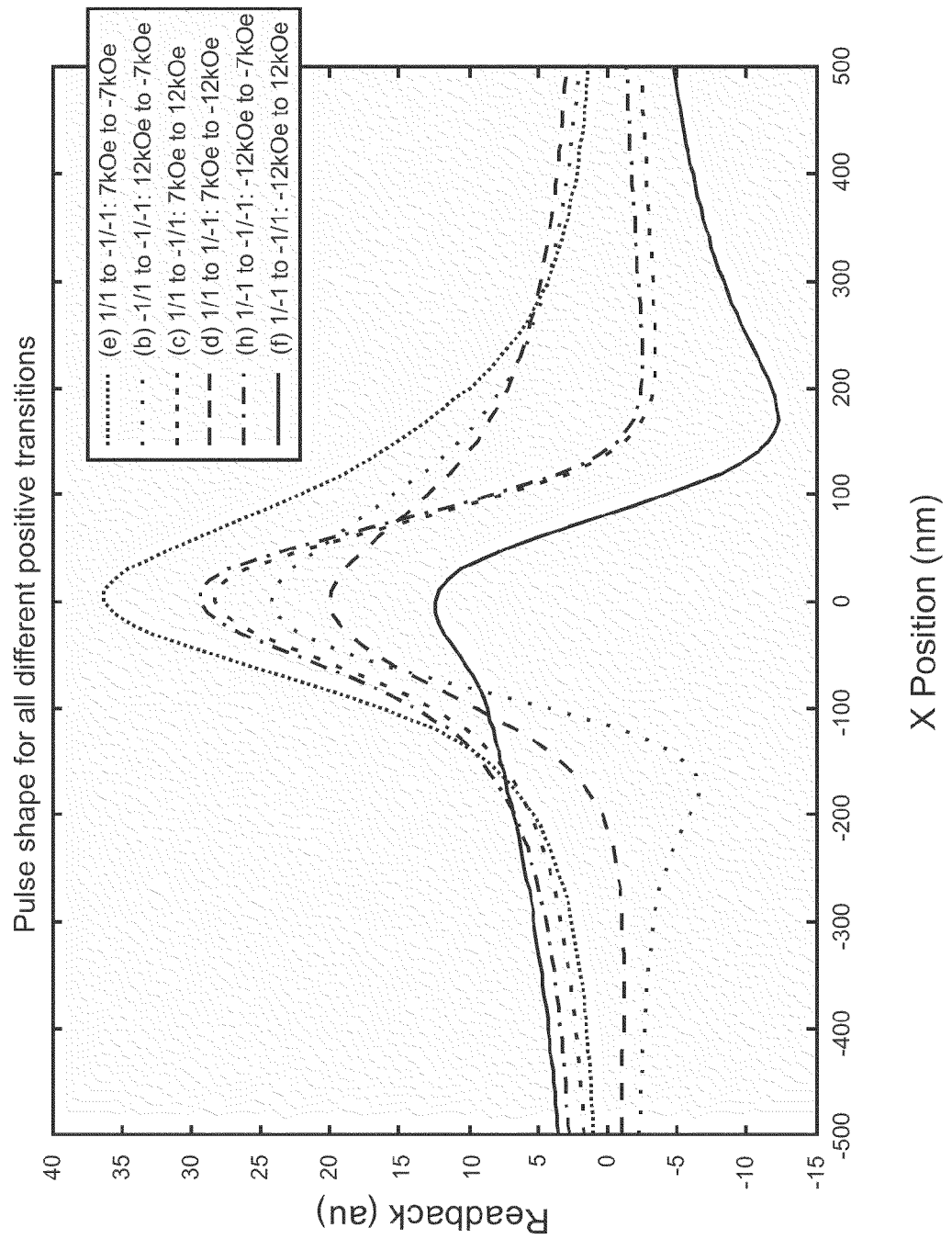
FIG. 8 shows the 6 positive readback pulse shapes of the 12 readback pulse shapes from the 12 magnetization state transitions of FIG. 7, in accordance with embodiments of the present invention.

FIG. 8 shows the 6 positive readback pulse shapes of the 12 readback pulse shapes from the 12 magnetization state transitions of FIG. 7, in accordance with embodiments of the present invention.

Four out of the six different positive readback pulse shapes are distinctive from one another. These are the pulse shapes corresponding to the magnetization state transitions (f), (d), (b), (e). The readback pulse shapes corresponding to the magnetization state transitions (c) and (h) are, however, very similar and cannot be easily differentiated. This is because there is no transition in the bottom layer of the medium and there is the same transition in the top layer (see FIG. 5, transition states (c) and (h)). Since there is almost no contribution to the pulse shape from the medium when no transitions are present, it is thus not a surprise that transitions (c) and (h) present the same pulse shape. Magnetization state transitions (b) and (d) should also be very similar for the same reason, namely that there is no transition in the top layer of the medium but the same transition in the top layer (see FIG. 5, transitions (b) and (d)). For transition (b), however, there is a small reversed domain due to the rapid variation of write current from very high I2 to low write current I1. As a result, the readback pulse shapes corresponding to the transitions (b) and (d) are distinguishable although relatively close in amplitude and shape.

To resolve the ambiguity between the transitions (c) and (h), it is necessary to consider the next transition state in the media, along the read direction X. The next transition after transition (c) is necessarily (a), or (b), or (l), and the next transition after transition (h) is necessarily (i), or (j), or (k). The pulse shape for magnetization state transition (a), (b), (i), or are easily distinguishable from each other. Therefore, the ambiguity between transition (c) and (h) can be resolved when the following transition is (a), (b), (i) or (j). Otherwise, it is not possible to resolve the ambiguity between transition (c) and (h) because the transition (l) and the transition (k) also have similar readback pulse shapes. In that particular case, it is necessary to consider as well the next transition to decode the written data. Similarly the transition after transition (l), is necessarily (f), or (g), or (c), and the transition after transition (k), is necessarily (d), or (e), or (h). The readback pulse shape for magnetization state transition (f), (g), (d) and (e) are easily distinguishable from each other. Therefore, the ambiguity between transition (l) and (k) is resolved when the next detected readback pulse shape corresponds to the transition state (f), (g), (d) or (e). In turn, the ambiguity between (c) and (h) from the previous transition is also released. In the two other cases, (l) and (k) being followed by (c) and (h) respectively, it is not possible to resolve the ambiguity between (l) and (k). In that particular case, it is necessary to consider the next transition.

This decoding scheme can be applied for several consecutive transitions. The ambiguity between the sequence of transitions . . . (c)-(l)-(c)-(l) . . . and the sequence of transition . . . (h)-(k)-(h)-(k) . . . is resolved as soon as the transition (c) is not followed by the transition (l), or the transition (l) is not followed by the transition (c), or the transition (h) is not followed by the transition (k), or the transition (k) is not followed by the transition (l). Coding during write can be used to prevent too long magnetization state transition sequences . . . (l)-(c)-(l)-(c) . . . or . . . (h)-(k)-(h)-(k) . . . . If required this technique may be applied in a similar fashion for magnetization state transitions (b) and (d) and their symmetrical counterparts: transitions (g) and (l).

Thus, different magnetization combinations with two levels can all be distinguished by the pulse shape of the transition or by the pulse shape of the transition and that of the next transitions. This can be included into adapted readback channel and data encoding.

The preceding example presented supra in conjunction with FIGS. 5, 7, and 8 is an illustrative example. The amplitude level and the shape of each of these readback pulse shapes can be optimized by the design of the magnetic medium 30 (see FIG. 1) and also depends on the write head and read head characteristics.

In the preceding example, an ambiguity in a first magnetization states transition was resolved by considering the next transition. More generally, resolving an ambiguity in a first transition may require considering at least one next transition, such as the next two transitions, the next three transitions, etc., depending on the extent to which different readback pulse shapes are distinguished from each other, which in turn depends on the design of the magnetic medium 30 (see FIG. 1) and on the write head and read head characteristics.

For a 2-layer continuous magnetic medium described supra, the method of the present invention writes magnetic states of the two layers simultaneously, thus allowing recording with doubled capacity in a single writing step. The method of the present invention enables determination of magnetic state transitions between written magnetic states by decoding readback pulse shapes specific to the magnetic state transitions.

Figure 9:
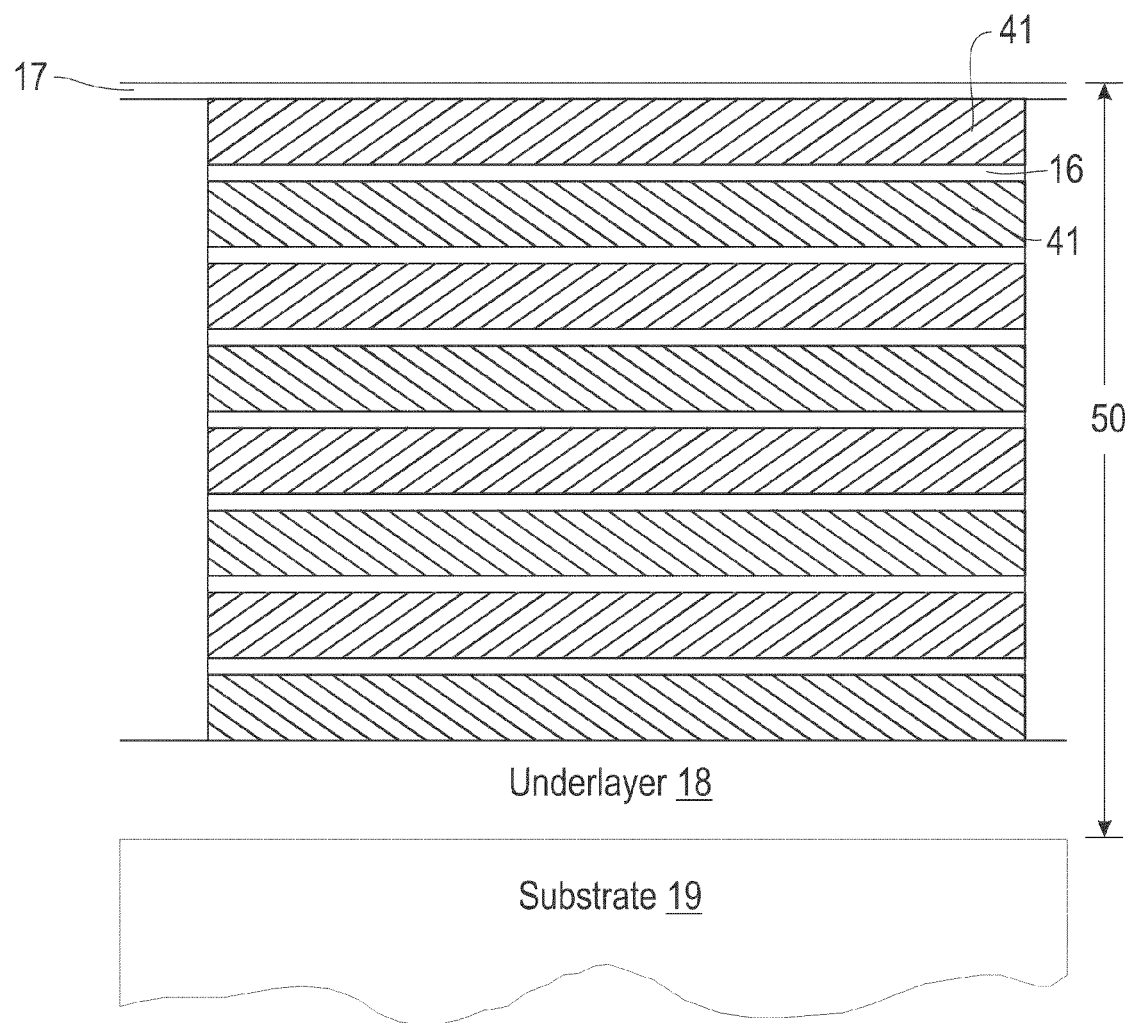
FIG. 9 is a schematic description of a multi-layer continuous magnetic medium with more than two layers, in accordance with embodiments of the present invention.

FIG. 9 is a schematic description of a multi-layer continuous magnetic medium 50 with N layers such that N is an integer of at least 2, in accordance with embodiments of the present invention. The magnetic medium 50 comprises recording layers 41, each layer 41 being a granular or particulate magnetic layer. The layers may be separated by a spacer layer 16. The magnetic medium 50 may include an overcoat 17, and an under-layer 18 between the recording layers 41 and a substrate 19.

The N magnetic layers 41 are isolated from each other by a spacer layer 16. Each layer 41 is a single-domain particle or an assembly of particles that behave as a single magnetic volume. A pair of layers 41 can be written in a single write step as described supra, resulting in a reduction in writing steps by a factor of 2 in comparison with existing writing methods. For cases of N>2, the two layers in the pair of layers 41 may be any two layers of the N layers and are not required to be two physically consecutive layers (i.e., two neighboring layers with no other layer disposed therebetween).

In one embodiment, N is an even or odd integer of at least 2.

At least one layer of the pair of layers has a hard axis angle between −90 and 0 degrees.

Figure 10:
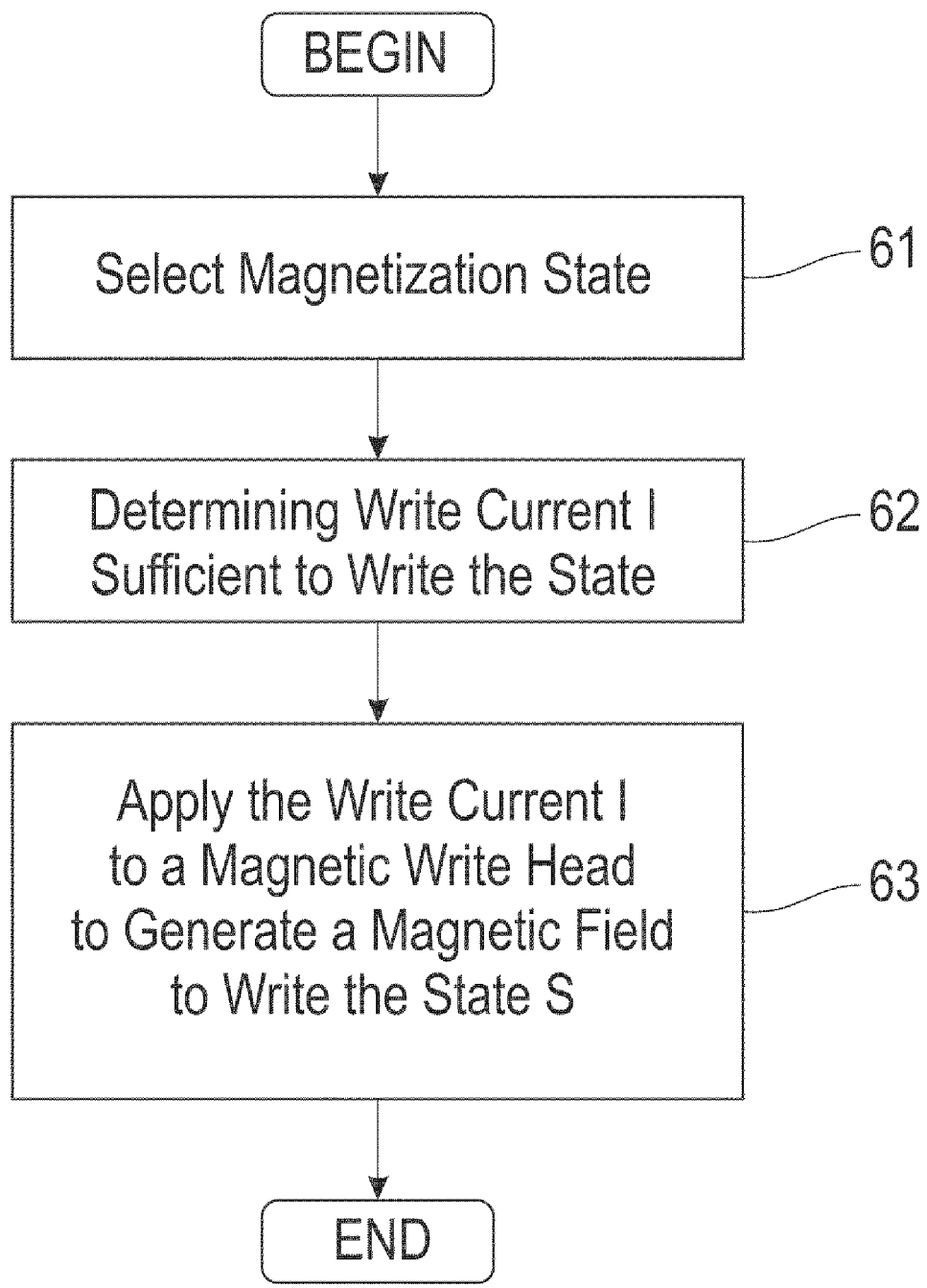
FIG. 10 is a flow chart of a method for writing a magnetization state in a multi-layer continuous magnetic medium, in accordance with embodiments of the present invention.

FIG. 10 is a flow chart of a method for writing magnetization states in a multi-layer continuous magnetic medium, in accordance with embodiments of the present invention. The magnetic medium comprises N magnetic layers oriented in an X direction and extending in a Y direction. The layers are distributed in a Z direction, wherein the X, Y, and Z directions are mutually orthogonal. Consecutive magnetic layers are separated by spacer material (e.g., non-magnetic spacer material). The method of FIG. 10 comprises steps 61-63.

Step 61 selects a magnetization state [S1; S2] comprising a magnetic state (S1) in a first magnetic layer of the N magnetic layers and a magnetic state (S2) in a second magnetic layer of the N magnetic layers, wherein N is at least 2.

Step 62 determines a write current (I) sufficient to write the magnetization state [S1; S2] from a relationship (R) involving $\alpha_1^*$, $\alpha_2^*$, $H_1$, $H_2$, $\phi_1$ and $\phi_2$, wherein $H_1$ and $H_2$ respectively denote a magnetic field strength in the first magnetic layer and the second magnetic layer, wherein $\phi_1$ and $\phi_2$ respectively denote a magnetic field angle with respect to the X direction in the first magnetic layer and the second magnetic layer, and wherein $\alpha_1^*$ and $\alpha_2^*$ are a first tilt angle and a second tilt angle at which a magnetic hard axis of the first magnetic layer and the second magnetic layer are respectively oriented with respect to the X direction.

The magnetization state [S1; S2] is a state A=[+1,+1], a state B=[−1, −1], a state C=[+1,−1], or a state D=[−1,+1], wherein the magnetic state S1 is respectively +1 or −1 if a magnetization of the first magnetic layer is oriented along its easy axis, at or opposite to the angle $\alpha_1$ with respect to the X direction, and wherein the magnetic state S2 is respectively +1 or −1 if a magnetization of the second magnetic layer is oriented along its easy axis at or opposite to the angle $\alpha_2$ with respect to the X direction.

Step 63 applies the write current I to a magnetic write head moving in the X direction to generate in the first magnetic layer and in the second magnetic layer the magnetic fields $H_1$ and $H_2$ respectively, oriented at the field angle $\phi_1$ and $\phi_2$ respectively, resulting in writing the magnetization state [S1; S2] by simultaneously writing the magnetic state S1 in the first magnetic layer and the magnetic state S2 in the second magnetic layer.

The write current I will write the magnetization state [S1; S2] in the first and second layer of the N layers as described supra for step 63. If N>2, the write current I may also write the remaining (N−2) layers of the N layers in a manner that depends on the magnetic properties of the remaining (N−2) layers of the N layers. In one embodiment, the remaining (N−2) layers are not being used and their magnetic states are of no concern while the magnetization state [S1; S2] is being written in the first and second layers, so that it does not matter in this embodiment what is specifically written in the remaining (N−2) layers. What may be written in the remaining (N−2) layers will contribute to the unique transition signal of the magnetization state $[S1; S2]_x$ and $[S1; S2]_{x+1}$. This readback pulse shape will necessarily be different to the readback pulse shapes corresponding to the other combination of magnetization states.

Figure 12:
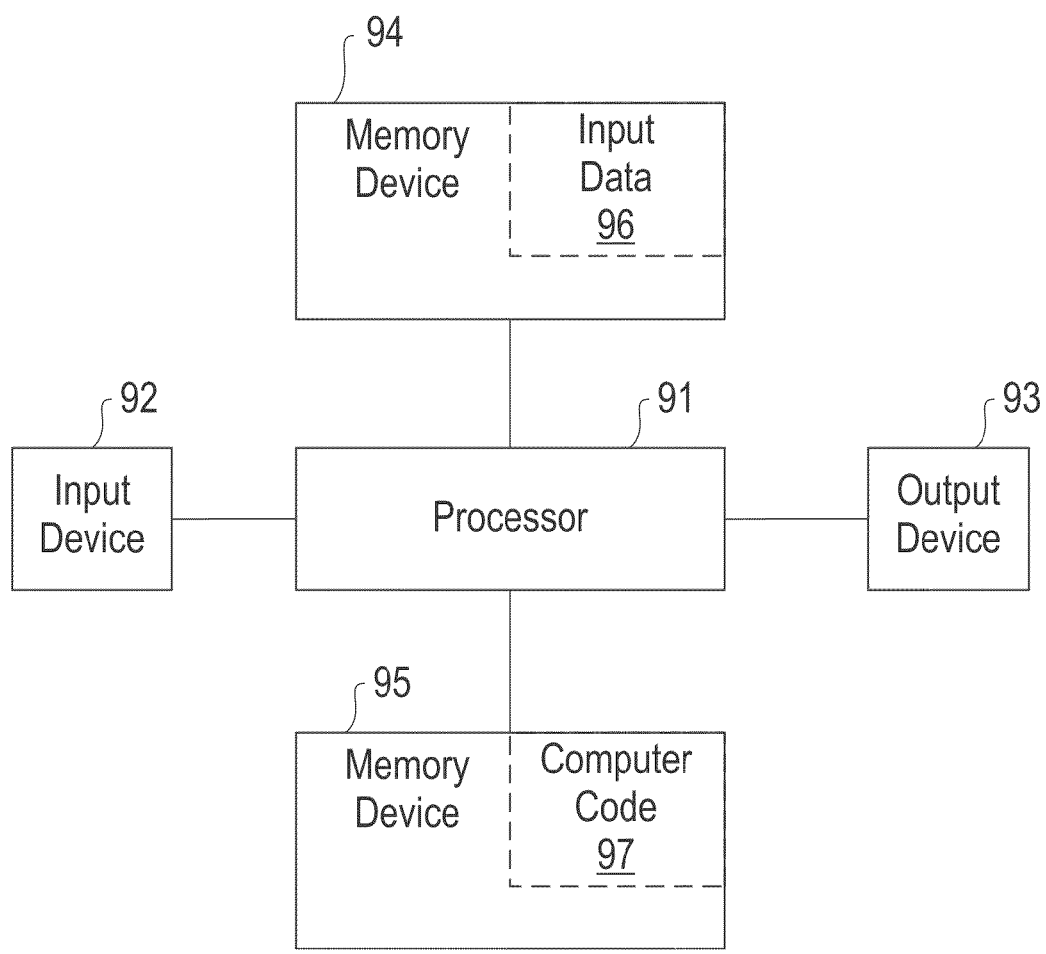
FIG. 12 illustrates a computer system used for executing software to implement the methodology of the present invention.

In one embodiment, steps 61-63 may be implemented in software via the computer system 90 of FIG. 12. The software selects the magnetization state [S1; S2] in step 61, executes determining the write current I in step 62, and executes issuing a command for applying the write current I to the magnetic write head in step 63 which causes the magnetic write head to write the magnetization state [S1; S2] by simultaneously writing the magnetic state S1 in the first magnetic layer and the magnetic state S2 in the second magnetic layer.

Figure 11:
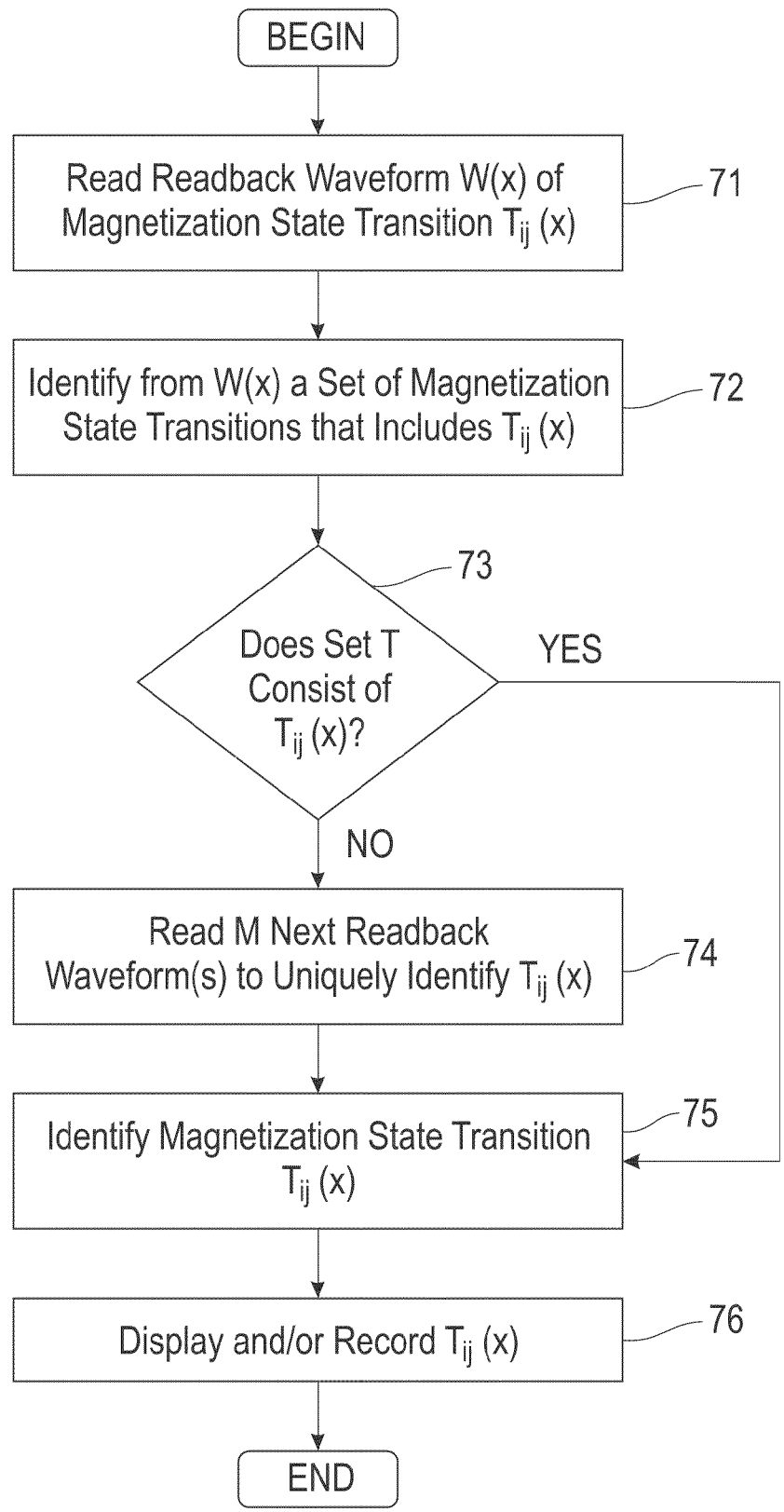
FIG. 11 is a flow chart of a method for reading magnetization states from a two-layer continuous magnetic medium, in accordance with embodiments of the present invention.

FIG. 11 is a flow chart of a method for reading magnetization states from a two-layer continuous magnetic medium, in accordance with embodiments of the present invention. The magnetic medium comprises two magnetic layers distributed in a Z direction orthogonal to the X-Y plane of the layers. Consecutive magnetic layers may be separated by spacer material (e.g., non-magnetic spacer material). The method of FIG. 11 comprises steps 71-76.

Step 71 reads, by a magnetic read head moving in the X direction, a readback pulse shape W(x) associated with a magnetization state transition $T_{ij}(x)$ corresponding to a transition at a defined location (x) along the X axis on the magnetic medium 30 from a first magnetization state that includes [S1; S2]$_i$ to the next magnetization state that includes [S1; S2]$_j$, wherein i and j are each 1, 2, 3, or 4 subject to i≠j. S1 is a magnetic state in a first magnetic layer of the two magnetic layers and S2 is a magnetic state in a second magnetic layer of the two magnetic layers. The first magnetic layer and the second magnetic layer have a magnetic easy axis respectively oriented at a first tilt angle ($\alpha_1$) and a second tilt angle ($\alpha_2$) with respect to the X direction. The magnetization state [S1; S2]$_1$, [S1; S2]$_2$, [S1; S2]$_3$, and [S1; S2]$_4$ respectively consists of a state A=[+1,+1], a state B=[-1,-1], a state C=[+1,-1], and a state D=[-1,+1]. The magnetic state S1 is respectively +1 or -1 if a magnetization of the first layer is oriented at or opposite the angle $\alpha_1$ with respect to the X direction. The magnetic state S2 is respectively +1 or -1 if a magnetization of the second layer is oriented at or opposite the angle $\alpha_2$ with respect to the X direction. The first magnetic layer and the second magnetic layer have a magnetic hard axis respectively oriented at a first tilt angle ($\alpha_1$*) and a second tilt angle ($\alpha_2$*) with respect to the X direction. At least one tilt angle of the two tilt angles ($\alpha_1$*) and ($\alpha_2$*) is between -90 and 0 degrees.

Step 72 identifies, from the readback pulse shape W(x) that was read in step 71, a set (T) of magnetization state transition that correspond to the pulse shape $W_{ij}(x)$. Either the set (T) consists of $T_{ij}(x)$ if W(x) has a pulse shape that is distinctive and distinguishable from a pulse shape of each other state transition of all possible magnetization state transitions so as to uniquely identify $T_{ij}(x)$ or the set (T) comprises $T_{ij}(x)$ and at least one other magnetization state transition of all possible magnetization state transitions whose associated pulse shape is not distinctive and distinguishable from the pulse shape of W(x). Said all possible magnetization state transitions are a function of the design of the magnetic medium 30 (see FIG. 1) and of the write head and read head characteristics.

Step 73 determines whether the set (T) consists of $T_{ij}(x)$ or comprises at least one other state transition. If step 73 determines that the set (T) consists of $T_{ij}(x)$ (or does not comprises the at least one other state transition) then step 75 is next executed; otherwise step 74 is next executed.

Step 74 reads, by the magnetic read head moving in the X direction, a next M readback pulse shapes denoted as W(x$_1$), W(x$_2$), ..., W(x$_M$) corresponding to the next M magnetization state transitions read by the magnetic read head at positions x$_1$, x$_2$, ..., x$_M$ (x<x$_1$<x$_2$< ... <x$_M$) along the X axis in the magnetic medium 30, wherein M is at least 1. W(x$_M$) has a shape that is distinctive and distinguishable from the pulse shape of all other magnetization state transition of the all possible magnetization state transitions. The readback pulse shape W(x) together with the next M readback pulse shapes uniquely identifies $T_{ij}(x)$.

Step 75 identifies the magnetization state transition $T_{ij}(x)$ from W(x) if the set (T) consists of $T_{ij}(x)$ or from W(x) together with the next M readback pulse shapes if the set (T) comprises $T_{ij}(x)$ and the at least one other state transition.

Step 76 displays and/or records the magnetization state transition $T_{ij}(x)$ identified in step 75. For example, the uniquely identified magnetization state transition $T_{ij}(x)$ may be displayed on a display device of the computer system 12 of FIG. 12 and/or recorded (i.e., written) in a memory device of the computer system 90 of FIG. 12.

In one embodiment, steps 71-76 may be implemented in software via the computer system 90 of FIG. 12. The software issues a command for reading, by the magnetic read head, the readback pulse shape W(x) in step 71 (which causes the magnetic read head to read the pulse shape W(x)), identifies the set (T) in step 72, determines whether the set (T) consists of $T_{ij}(x)$ in step 73, issues a command for reading, by the magnetic read head, the Next M pulse shapes in step 74, identifies $T_{ij}(x)$ in step 75, and displays and/or records $T_{ij}(x)$ in step 76.

FIG. 12 illustrates a computer system 90 used for executing software to implement the methodology of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be at least one of, inter alia, a printer, a plotter, a computer screen, a magnetic tape, a removable hard disk, a floppy disk, etc. The memory devices 94 and 95 may be at least one of, inter alia, a hard disk, a floppy disk, a magnetic tape, an optical storage such as a compact disc (CD) or a digital video disc (DVD), a random access memory (RAM), a dynamic random access memory (DRAM), a read-only memory (ROM), etc. The memory device 95 includes a computer code 97. The computer code 97 comprises software to implement the methodology of the present invention. The processor 91 executes the computer code 97. The memory device 94 includes input data 96. The input data 96 includes input required by the computer code 97. The output device 93 stores or displays output from the computer code 97. Either or both memory devices 94 and 95 (or one or more additional memory devices not shown in FIG. 12) may be used as a computer usable storage medium (or a computer readable storage medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable storage medium (or said program storage device).

In one embodiment, an apparatus of the present invention comprises the computer program product. In one embodiment, an apparatus of the present invention comprises the computer system such that the computer system comprises the computer program product.

While FIG. 12 shows the computer system 90 as a particular configuration of hardware and software, any configuration of hardware and software, as would be known to a person of ordinary skill in the art, may be utilized for the purposes stated supra in conjunction with the particular computer system 90 of FIG. 12. For example, the memory devices 94 and 95 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for writing magnetization states in a multilayer continuous magnetic medium comprising a plurality of magnetic layers, each magnetic layer comprising magnetic material continuously distributed in an X-Y plane defined by an X direction and a Y direction orthogonal to each other, consecutive magnetic layers separated by non-magnetic spacer material and distributed along a Z direction orthogonal to the X-Y plane, said method comprising:

selecting a magnetization state [S1; S2] comprising a magnetic state (S1) and a magnetic state (S2) in a first magnetic layer and in a second magnetic layer, respectively, of the plurality of magnetic layers, wherein magnetic states (S1) and (S2) are independent of each other, wherein $\alpha_1^*$ and $\alpha_2^*$ are a first tilt angle and a second tilt angle at which a hard axis of the first magnetic layer and the second magnetic layer are respectively oriented with respect to the X direction, and wherein both of $\alpha_1^*$ and $\alpha_2^*$ differ from 0, 90, 180 and 270 degrees, and wherein $-90<\alpha_1^*<0$ and/or $-90<\alpha_2^*<0$;

determining a write current (I) sufficient to write the magnetization state [S1; S2];

applying the write current I to a magnetic write head moving in the X direction to generate in the first magnetic layer and the second magnetic layer a magnetic field that exceeds a switching field of the first magnetic layer and a switching field of the second magnetic layer;

responsive to said applying, said magnetic write head writing the magnetization state [S1; S2] by simultaneously writing the magnetic state S1 in the first magnetic layer and the magnetic state S2 in the second magnetic layer.

2. The method of claim 1,
wherein during said simultaneously writing the magnetic field has a magnetic field strength $H_1$ and $H_2$ in the first magnetic layer and the second magnetic layer, respectively;
wherein during said simultaneously writing the magnetic field is oriented at a field angle $\phi_1$ and $\phi_2$ with respect to the X direction in the first magnetic layer and the second magnetic layer, respectively;
wherein $\alpha_i$ and $\alpha_2$ are a first tilt angle and a second tilt angle at which a magnetic easy axis of the first magnetic layer and the second magnetic layer are respectively oriented with respect to the X direction;
wherein the magnetic state S1 is respectively +1 or −1 if a magnetization of the first magnetic layer is oriented at or opposite to the angle $\alpha_i$;
wherein the magnetic state S2 is respectively +1 or −1 if a magnetization of the second magnetic layer is oriented at or opposite to the angle $\alpha_2$;
wherein the magnetization state [S1; S2] is a state A=[+1,+1], a state B=[−1,−1], a state C=[+1,−1], or a state D=[−1,+1];
wherein said determining the write current I comprises determining the write current I from a relationship (R) involving $\alpha_1^*$, $\alpha_2^*$, $H_1$, $H_2$, $\phi_1$, and $\phi_2$.

3. The method of claim 2, wherein $\alpha_i \neq \alpha_2$.

4. The method of claim 2, wherein $-80 \leq \alpha_1^* \leq -10$ and $-180 < \alpha_2^* < -90$.

5. The method of claim 2, wherein $-80 \leq \alpha_1^* \leq -10$ and $-90 < \alpha_2^* < 0$.

6. The method of claim 2,
wherein the first magnetic layer and the second magnetic layer have a switching field $H_{sw,1}(\phi_1)$ and $H_{sw,2}(\phi_2)$, respectively;
wherein if [S1; S2]=A then the relationship R and the write current I are selected from the group consisting of a relationship R1a and I=I1a, a relationship R1b and I=I1b, a relationship R1c and I=I1c, a relationship R1d and I=I1d, a relationship R1e and I=−I1e, and a relationship R1f and I=−I1f;
wherein if [S1; S2]=B then the relationship R and the write current I are selected from the group consisting of the relationship R1a and I=−I1a, the relationship R1b and I=−I1b, the relationship R1c I=−I1c, and the relationship R1d and I=−I1d, the relationship R1e and I=I1e, and a relationship R1f and I=I1f;
wherein if [S1; S2]=C then the relationship R and the write current I are selected from the group consisting of a relationship R2a and I=−I2a, a relationship R2b and I=I2b, a relationship R2c and I=−I2c, a relationship R2d and I=I2d, a relationship R2e and I=−I2e, and a relationship R2f and I=I2f;
wherein if [S1; S2]=D then the relationship R and the write current I are selected from the group consisting of the relationship R2a and I=I2a, the relationship R2b and I=−I2b, the relationship R2c I=I2c, and the relationship R2d and I=−I2d, a relationship R2e and I=I2e, and a relationship R2f and I=−I2f;
said relationship R1a is $-80 \leq \alpha_1^* \leq -10$, $\alpha_1^* < \phi_1 < 0$, $H_1 \geq H_{sw,1}(\phi_1)$, $-180 < \alpha_2^* < -90$, $\alpha_2^* < \phi_2 < 0$, $H_2 \geq H_{sw,2}(\phi_2)$;
said relationship R2a is $-80 \leq \alpha_1^* \leq -10$, $-90 < \phi_1 < \alpha_1^*$, $H_1 \geq H_{sw,1}(\phi_1)$, $-180 < \alpha_2^* < -90$, $\alpha_2^* < \phi_2 < 0$, $H_2 \geq H_{sw,2}(\phi_2)$;
said relationship R1b is $-180 < \alpha_1^* < -90$, $\alpha_1^* < \phi_1 < 0$, $H_1 \geq H_{sw,1}(\phi_1)$, $-80 \leq \alpha_2^* \leq -10$, $\alpha_2^* < \phi_2 < 0$, $H_2 \geq H_{sw,2}(\phi_2)$;
said relationship R2b is $-180 < \alpha_1^* < -90$, $\alpha_1^* < \phi_1 < 0$, $H_1 > H_{sw,1}(\phi_1)$, $-80 \leq \alpha_2^* \leq -10$, $-90 < \phi_2 < \alpha_2^*$, $H_2 \geq H_{sw,2}(\phi_2)$;
said relationship R1c is $-80 \leq \alpha_1^* \leq -10$, $\alpha_1^* < \phi_1 < 0$, $H_1 \geq H_{sw,1}(\phi_1)$, $-90 < \alpha_2^* < 0$, $\alpha_2^* < \phi_2 < 0$, $H_2 \geq H_{sw,2}(\phi_2)$;
said relationship R2c is $-80 \leq \alpha_1^* \leq -10$, $-90 < \phi_1 < \alpha_1^*$, $H_1 \geq H_{sw,1}(\phi_1)$, $-90 < \alpha_2^* < 0$, $0 < \phi_2 < 0$, $H_2 \geq H_{sw,2}(\phi_2)$;
said relationship R1d is $90 < \alpha_1^* < 0$, $\alpha_1^* < \phi_1 < 0$, $H_1 \geq H_{sw,1}(\phi_1)$, $-80 \leq \alpha_2^* \leq -10$, $\alpha_2^* < \phi_2 < 0$, $H_2 \geq H_{sw,2}(\phi_2)$;
said relationship R2d is $-90 < \alpha_1^* < 0$, $\alpha_1^* < \phi_1 < 0$, $H_1 \geq H_{sw,1}(\phi_1)$, $-80 \leq \alpha_2^* \leq -10$, $-90 < \phi_2 < a_2^*$, $H_2 \geq H_{sw,2}(\phi_2)$;
said relationship R1e is $-80 \leq \alpha_1^* \leq -10$, $-90 < \phi_1 < \alpha_1^*$, $H_1 \geq H_{sw,1}(\phi_1)$, $-90 < \alpha_2^* < 0$, $-90 < \phi_2 < \alpha_2^*$, and $H_2 \geq H_{sw,2}(\phi_2)$;
said relationship R2e is $-80 \leq \alpha_1^* \leq -10$, $-90 < \phi_1 < \alpha_1^*$, $H_1 \geq H_{sw,1}(\phi_1 - 90 < \alpha_2^* < 0$, $\alpha_2^* < \phi_2 < 0$, $H_2 \geq H_{sw,2}(\phi_2)$;
said relationship R1f is $-90 < \alpha_1^* < 0$, $-90 < \phi_1 < \alpha_1^*$, $H_1 \geq H_{sw,1}(\phi_1)$, $-80 \leq \alpha_2^* \leq -10$, $-90 < \phi_2 < \alpha_2^*$, $H_2 \geq H_{sw,2}(\phi_2)$;
said relationship R2f is $-90 < \alpha_1^* < 0$, $\alpha_1^* < \phi_1 < 0$, $H_1 \geq H_{sw,1}(\phi_1)$, $-80 \leq \alpha_2^* \leq -10$, $-90 < \phi_2 < \alpha_2^*$, $H_2 \geq H_{sw,2}(\phi_2)$.

7. A computer program product, said computer program product comprising a computer readable storage device having a computer readable program code stored therein, said computer readable program code containing instructions that when executed by a processor of a computer system implement a method for writing magnetization states in a multilayer continuous magnetic medium comprising a plurality of magnetic layers, each magnetic layer comprising magnetic material continuously distributed in an X-Y plane defined by an X direction and a Y direction orthogonal to each other, consecutive magnetic layers separated by non-magnetic spacer material and distributed along a Z direction orthogonal to the X-Y plane, said method comprising:

selecting a magnetization state [S1; S2] comprising a magnetic state (S1) and a magnetic state (S2) in a first magnetic layer and in a second magnetic layer, respectively, of the plurality of magnetic layers, wherein magnetic states (S1) and (S2) are independent of each other, wherein $\alpha_1$* and $\alpha_2$* are a first tilt angle and a second tilt angle at which a hard axis of the first magnetic layer and the second magnetic layer are respectively oriented with respect to the X direction, and wherein both of $\alpha_1$* and $\alpha_2$* differ from 0, 90, 180 and 270 degrees, and wherein $-90<\alpha_1^*<0$ and/or $-90<\alpha_2^*<0$;

determining a write current (I) sufficient to write the magnetization state [S1; S2];

issuing a command for applying the write current I to a magnetic write head moving in the X direction to generate in the first magnetic layer and the second magnetic layer a magnetic field that exceeds a switching field of the first magnetic layer and a switching field of the second magnetic layer, respectively, said command causing the magnetic write head to write the magnetization state [S1; S2] by simultaneously writing the magnetic state S1 in the first magnetic layer and the magnetic state S2 in the second magnetic layer.

8. The computer program product of claim 7, wherein during said simultaneously writing the magnetic field has a magnetic field strength $H_1$ and $H_2$ in the first magnetic layer and the second magnetic layer, respectively;

wherein during said simultaneously writing the magnetic field is oriented at a field angle $\phi_1$ and $\phi_2$ with respect to the X direction in the first magnetic layer and the second magnetic layer, respectively;

wherein $\alpha_i$ and $\alpha_2$ are a first tilt angle and a second tilt angle at which a magnetic easy axis of the first magnetic layer and the second magnetic layer are respectively oriented with respect to the X direction;

wherein the magnetic state S1 is respectively +1 or −1 if a magnetization of the first magnetic layer is oriented at or opposite to the angle $\alpha_i$;

wherein the magnetic state S2 is respectively +1 or −1 if a magnetization of the second magnetic layer is oriented at or opposite to the angle $\alpha_2$;

wherein the magnetization state [S1; S2] is a state A=[+1,+1], a state B=[−1,−1], a state C=[+1,−1], or a state D=[−1,+1];

wherein said determining the write current I comprises determining the write current I from a relationship (R) involving $\alpha_1$*, $\alpha_2$*, $H_i$, $H_2$, $\phi_i$, and $\phi_2$.

9. The computer program product of claim 8, wherein $\alpha_i \neq \alpha_2$.

10. The computer program product of claim 8, wherein $-80 \leq \alpha_1^* \leq -10$ and $-180 < \alpha_2^* < -90$.

11. The computer program product of claim 8, wherein $-80 \leq \alpha_1^* \leq -10$ and $-90 < \alpha_2^* < 0$.

12. The computer program product of claim 8, wherein the first magnetic layer and the second magnetic layer have a switching field $H_{sw,1}(\phi_1)$ and $H_{sw,2}(\phi_2)$, respectively;

wherein I1a, I1b, I1c, I1d, I1e, I1f, I2a, I2b, I2c, I2d, I2e, and I2f each denote a positive write current satisfying I1a<I2a, I1b<I2b, I1c<I2c, I1d<I2d, I1e>I2e, and I1f>I2f;

wherein if [S1; S2]=A then the relationship R and the write current I are selected from the group consisting of a relationship R1a and I=I1a, a relationship R1b and I=I1b, a relationship R1c and I=I1c, a relationship R1d and I=I1d, a relationship R1e and I=−I1e, and a relationship R1f and I=−I1f;

wherein if [S1; S2]=B then the relationship R and the write current I are selected from the group consisting of the relationship R1a and I=−I1a, the relationship R1b and I=−I1b, the relationship R1c I=−I1c, and the relationship R1d and I=−I1d, the relationship R1e and I=I1e, and a relationship R1f and I=I1f;

wherein if [S1; S2]=C then the relationship R and the write current I are selected from the group consisting of a relationship R2a and I=−I2a, a relationship R2b and I=I2b, a relationship R2c and I=−I2c, a relationship R2d and I=I2d, a relationship R2e and I=−I2e, and a relationship R2f and I=I2f;

wherein if [S1; S2]=D then the relationship R and the write current I are selected from the group consisting of the relationship R2a and I=I2a, the relationship R2b and I=−I2b, the relationship R2c I=I2c, and the relationship R2d and I=−I2d, a relationship R2e and I=I2e, and a relationship R2f and I=−I2f;

said relationship R1a is $-80 \leq \alpha_1^* \leq -10$, $\alpha_1^* < \phi_1 < 0$, $H_1 \geq H_{sw,1}(\phi_1)$, $-180 < \alpha_2^* < -90$, $\alpha_2^* < \phi_2 < 0$, $H_2 \geq H_{sw,2}(\phi_2)$;

said relationship R2a is $-80 \leq \alpha_1^* \leq -10$, $-90 < \phi_1 < \alpha_1^*$, $H_1 \geq H_{sw,1}(\phi_1)$, $-180 < \alpha_2^* < -90$, $\alpha_2^* < \phi_2 < 0$, $H_2 \geq H_{sw,2}(\phi_2)$;

said relationship R1b is $-180 < \alpha_1^* < -90$, $\alpha_1^* < \phi_1 < 0$, $H_1 \geq H_{sw,1}(\phi_1)$, $-80 \leq \alpha_2^* \leq -10$, $\alpha_2^* < \phi_2 < 0$, $H_2 \geq H_{sw,2}(\phi_2)$;

said relationship R2b is $-180 < \alpha_1^* < -90$, $\alpha_1^* < \phi_1 < 0$, $H_1 > H_{sw,1}(\phi_1)$, $-80 \leq \alpha_2^* \leq -10$, $-90 < \phi_2 < \alpha_2^*$, $H_2 \geq H_{sw,2}(\phi_2)$;

said relationship R1c is $-80 \leq \alpha_1^* \leq -10$, $\alpha_1^* < \phi_1 < 0$, $H_1 \geq H_{sw,1}(\phi_1)$, $-90 < \alpha_2^* < 0$, $\alpha_2^* < \phi_2 < 0$, $H_2 \geq H_{sw,2}(\phi_2)$;

said relationship R2c is $-80 \leq \alpha_1^* \leq -10$, $-90 < \phi_1 < \alpha_1^*$, $H_1 \geq H_{sw,1}(\phi_1)$, $-90 < \alpha_2^* < 0$, $0 < \phi_2 < 0$, $H_2 \geq H_{sw,2}(\phi_2)$;

said relationship R1d is $90 < \alpha_1^* < 0$, $\alpha_1^* < \phi_1 < 0$, $H_1 \geq H_{sw,1}(\phi_1)$, $-80 \leq \alpha_2^* \leq -10$, $\alpha_2^* < \phi_2 < 0$, $H_2 \geq H_{sw,2}(\phi_2)$;

said relationship R2d is $-90 < \alpha_1^* < 0$, $\alpha_1^* < \phi_1 < 0$, $H_1 \geq H_{sw,1}(\phi_1)$, $-80 \leq \alpha_2^* \leq -10$, $-90 < \phi_2 < a_2^*$, $H_2 \geq H_{sw,2}(\phi_2)$;

said relationship R1e is $-80 \leq \alpha_1^* \leq -10$, $-90 < \phi_1 < \alpha_1^*$, $H_1 \geq H_{sw,1}(\phi_1)$, $-90 < \alpha_2^* < 0$, $-90 < \phi_2 < \alpha_2^*$, and $H_2 \geq H_{sw,2}(\phi_2)$;

said relationship R2e is $-80 \leq \alpha_1^* \leq -10$, $-90 < \phi_1 < \alpha_1^*$, $H_1 \geq H_{sw,1}(\phi_1)$, $-90 < \alpha_2^* < 0$, $\alpha_2^* < \phi_2 < 0$, $H_2 \geq H_{sw,2}(\phi_2)$;

said relationship R1f is $-90 < \alpha_1^* < 0$, $-90 < \phi_1 < \alpha_1^*$, $H_1 \geq H_{sw,1}(\phi_1)$, $-80 \leq \alpha_2^* \leq -10$, $-90 < \phi_2 < \alpha_2^*$, $H_2 \geq H_{sw,2}(\phi_2)$;

said relationship R2f is $-90 < \alpha_1^* < 0$, $\alpha_1^* < \phi_1 < 0$, $H_1 \geq H_{sw,1}(\phi_1)$, $-80 \leq \alpha_2^* \leq -10$, $-90 < \phi_2 < \alpha_2^*$, $H_2 \geq H_{sw,2}(\phi_2)$.

13. A computer system comprising a processor and a computer readable memory unit coupled to the processor, said memory unit containing instructions configured to be executed by the processor to implement a method for writing magnetization states in a multi-layer continuous magnetic medium comprising a plurality of magnetic layers, each magnetic layer comprising magnetic material continuously distributed in an X-Y plane defined by an X direction and a Y direction orthogonal to each other, consecutive magnetic layers separated by non-magnetic spacer material and distributed along a Z direction orthogonal to the X-Y plane, said method comprising:

selecting a magnetization state [S1; S2] comprising a magnetic state (S1) and a magnetic state (S2) in a first magnetic layer and in a second magnetic layer, respectively, of the plurality of magnetic layers, wherein magnetic states (S1) and (S2) are independent of each other, wherein $\alpha_1^*$ and $\alpha_2^*$ are a first tilt angle and a second tilt angle at which a hard axis of the first magnetic layer and the second magnetic layer are respectively oriented with respect to the X direction, and wherein both of $\alpha_1^*$ and $\alpha_2^*$ differ from 0, 90, 180 and 270 degrees, and wherein $-90<\alpha_1^*<0$ and/or $-90<\alpha_2^*<0$;

determining a write current (I) sufficient to write the magnetization state [S1; S2];

issuing a command for applying the write current I to a magnetic write head moving in the X direction to generate in the first magnetic layer and the second magnetic layer a magnetic field that exceeds a switching field of the first magnetic layer and a switching field of the second magnetic layer, respectively, said command causing the magnetic write head to write the magnetization state [S1; S2] by simultaneously writing the magnetic state S1 in the first magnetic layer and the magnetic state S2 in the second magnetic layer.

14. The computer system of claim 13, wherein during said simultaneously writing the magnetic field has a magnetic field strength $H_1$ and $H_2$ in the first magnetic layer and the second magnetic layer, respectively;

wherein during said simultaneously writing the magnetic field is oriented at a field angle $\phi_1$ and $\phi_2$ with respect to the X direction in the first magnetic layer and the second magnetic layer, respectively;

wherein $\alpha_1$ and $\alpha_2$ are a first tilt angle and a second tilt angle at which a magnetic easy axis of the first magnetic layer and the second magnetic layer are respectively oriented with respect to the X direction;

wherein the magnetic state S1 is respectively +1 or −1 if a magnetization of the first magnetic layer is oriented at or opposite to the angle $\alpha_1$;

wherein the magnetic state S2 is respectively +1 or −1 if a magnetization of the second magnetic layer is oriented at or opposite to the angle $\alpha_2$;

wherein the magnetization state [S1; S2] is a state A=[+1,+1], a state B=[−1,−1], a state C=[+1,−1], or a state D=[−1,+1];

wherein said determining the write current I comprises determining the write current I from a relationship (R) involving $\alpha_1^*$, $\alpha_2^*$, $H_1$, $H_2$, $\phi_1$, and $\phi_2$.

15. The computer system of claim 14, wherein $\alpha_1 \neq \alpha_2$.

16. The computer system of claim 14, wherein $-80 \leq \alpha_1^* \leq -10$ and $-180 < \alpha_2^* < -90$.

17. The computer system of claim 14, wherein $-80 \leq \alpha_1^* \leq -10$ and $-90 < \alpha_2^* < 0$.

18. The computer system of claim 14, wherein the first magnetic layer and the second magnetic layer have a switching field $H_{sw,1}(\phi_1)$ and $H_{sw,2}(\phi_2)$, respectively;

wherein I1a, I1b, I1c, I1d, I1e, I1f, I2a, I2b, I2c, I2d, I2e, and I2f each denote a positive write current satisfying I1a<I2a, I1b<I2b, I1c<I2c, I1d<I2d, I1e>I2e, and I1f>I2f;

wherein if [S1; S2]=A then the relationship R and the write current I are selected from the group consisting of a relationship R1a and I=I1a, a relationship R1b and I=I1b, a relationship R1c and I=I1c, a relationship R1d and I=I1d, a relationship R1e and I=−I1e, and a relationship R1f and I=−I1f;

wherein if [S1; S2]=B then the relationship R and the write current I are selected from the group consisting of the relationship R1a and I=−I1a, the relationship R1b and I=−I1b, the relationship R1c I=−I1c, and the relationship R1d and I=−I1d, the relationship R1e and I=I1e, and a relationship R1f and I=I1f;

wherein if [S1; S2]=C then the relationship R and the write current I are selected from the group consisting of a relationship R2a and I=−I2a, a relationship R2b and I=I2b, a relationship R2c and I=−I2c, a relationship R2d and I=I2d, a relationship R2e and I=−I2e, and a relationship R2f and I=I2f;

wherein if [S1; S2]=D then the relationship R and the write current I are selected from the group consisting of the relationship R2a and I=I2a, the relationship R2b and I=−I2b, the relationship R2c I=I2c, and the relationship R2d and I=−I2d, a relationship R2e and I=I2e, and a relationship R2f and I=−I2f;

said relationship R1a is $-80 \leq \alpha_1^* \leq -10$, $\alpha_1^* < \phi_1 < 0$, $H_1 \geq H_{sw,1}(\phi_1)$, $-180 < \alpha_2^* < -90$, $\alpha_2^* < \phi_2 < 0$, $H_2 \geq H_{sw,2}(\phi_2)$;

said relationship R2a is $-80 \leq \alpha_1^* \leq -10$, $-90 < \phi_1 < \alpha_1^*$, $H_1 \geq H_{sw,1}(\phi_1)$, $-180 < \alpha_2^* < -90$, $\alpha_2^* < \phi_2 < 0$, $H_2 \geq H_{sw,2}(\phi_2)$;

said relationship R1b is $-180 < \alpha_1^* < -90$, $\alpha_1^* < \phi_1 < 0$, $H_1 \geq H_{sw,1}(\phi_1)$, $-80 \leq \alpha_2^* \leq -10$, $\alpha_2^* < \phi_2 < 0$, $H_2 \geq H_{sw,2}(\phi_2)$;

said relationship R2b is $-180 < \alpha_1^* < -90$, $\alpha_1^* < \phi_1 < 0$, $H_1 > H_{sw,1}(\phi_1)$, $-80 \leq \alpha_2^* \leq -10$, $-90 < \phi_2 < \alpha_2^*$, $H_2 \geq H_{sw,2}(\phi_2)$;

said relationship R1c is $-80 \leq \alpha_1^* \leq -10$, $\alpha_1^* < \phi_1 < 0$, $H_1 \geq H_{sw,1}(\phi_1)$, $-90 < \alpha_2^* < 0$, $\alpha_2^* < \phi_2 < 0$, $H_2 \geq H_{sw,2}(\phi_2)$;

said relationship R2c is $-80 \leq \alpha_1^* \leq -10$, $-90 < \phi_1 < \alpha_1^*$, $H_1 \geq H_{sw,1}(\phi_1)$, $-90 < \alpha_2^* < 0$, $0 < \phi_2 < 0$, $H_2 \geq H_{sw,2}(\phi_2)$;

said relationship R1d is $90 < \alpha_1^* < 0$, $\alpha_1^* < \phi_1 < 0$, $H_1 \geq H_{sw,1}(\phi_1)$, $-80 \leq \alpha_2^* \leq -10$, $\alpha_2^* < \phi_2 < 0$, $H_2 \geq H_{sw,2}(\phi_2)$;

said relationship R2d is $-90 < \alpha_1^* < 0$, $\alpha_1^* < \phi_1 < 0$, $H_1 \geq H_{sw,1}(\phi_1)$, $-80 \leq \alpha_2^* \leq -10$, $-90 < \phi_2 < a_2^*$, $H_2 \geq H_{sw,2}(\phi_2)$;

said relationship R1e is $-80 \leq \alpha_1^* \leq -10$, $-90 < \phi_1 < \alpha_1^*$, $H_1 \geq H_{sw,1}(\phi_1)$, $-90 < \alpha_2^* < 0$, $-90 < \phi_2 < \alpha_2^*$, and $H_2 \geq H_{sw,2}(\phi_2)$;

said relationship R2e is $-80 \leq \alpha_1^* \leq -10$, $-90 < \phi_1 < \alpha_1^*$, $H_1 \geq H_{sw,1}(\phi_1)$, $-90 < \alpha_2^* < 0$, $\alpha_2^* < \phi_2 < 0$, $H_2 \geq H_{sw,2}(\phi_2)$;

said relationship R1f is $-90 < \alpha_1^* < 0$, $-90 < \phi_1 < \alpha_1^*$, $H_1 \geq H_{sw,1}(\phi_1)$, $-80 \leq \alpha_2^* \leq -10$, $-90 < \phi_2 < \alpha_2^*$, $H_2 \geq H_{sw,2}(\phi_2)$;

said relationship R2f is $-90 < \alpha_1^* < 0$, $\alpha_1^* < \phi_1 < 0$, $H_1 \geq H_{sw,1}(\phi_1)$, $-80 \leq \alpha_2^* \leq -10$, $-90 < \phi_2 < \alpha_2^*$, $H_2 \geq H_{sw,2}(\phi_2)$.

* * * * *